US012043024B2

(12) United States Patent
Ichioka

(10) Patent No.: US 12,043,024 B2
(45) Date of Patent: Jul. 23, 2024

(54) PRINTING APPARATUS AND A PRINTING METHOD

(71) Applicant: SCREEN HOLDINGS CO., LTD., Kyoto (JP)

(72) Inventor: Yoshikazu Ichioka, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 221 days.

(21) Appl. No.: 17/637,187

(22) PCT Filed: Jun. 22, 2020

(86) PCT No.: PCT/JP2020/024379
§ 371 (c)(1),
(2) Date: Feb. 22, 2022

(87) PCT Pub. No.: WO2021/059627
PCT Pub. Date: Apr. 1, 2021

(65) Prior Publication Data

US 2022/0297447 A1 Sep. 22, 2022

(30) Foreign Application Priority Data

Sep. 27, 2019 (JP) ................................ 2019-176994

(51) Int. Cl.
*B41J 11/00* (2006.01)
*B41J 2/045* (2006.01)
*B41J 2/21* (2006.01)

(52) U.S. Cl.
CPC ......... *B41J 11/008* (2013.01); *B41J 2/04505* (2013.01); *B41J 2/2132* (2013.01); *B41J 2203/01* (2020.08)

(58) Field of Classification Search
CPC .... B41J 11/008; B41J 2/04505; B41J 2/2132; B41J 2203/01; B41J 2/2135; B41J 2/2146
See application file for complete search history.

(56) References Cited

U.S. PATENT DOCUMENTS

2006/0132517 A1 6/2006 Vinas
2007/0231020 A1 10/2007 Kadowaki
(Continued)

FOREIGN PATENT DOCUMENTS

EP 2 944 474 A2 11/2015
JP 2000-035704 A 2/2000
(Continued)

OTHER PUBLICATIONS

Iida, Masaru, Information Processing Device, Image Printing Apparatus, and Information Processing Method, Oct. 18, 2017, Europe, All Pages (Year: 2017).*
(Continued)

*Primary Examiner* — Justin Seo
*Assistant Examiner* — Tracey M McMillion
(74) *Attorney, Agent, or Firm* — Rimon P.C.

(57) ABSTRACT

A shift amount detecting chart is formed on web paper, and the shift amount detecting chart is photographed by an image pickup unit. An image processor calculates shift amounts smaller than a maximum shift amount in absolute values as correction values based on a variation trace of density peak positions from image data corresponding to the shift amount detecting chart photographed by the image pickup unit. A controller corrects printing timing with these correction values. Consequently, even when temporal variations occur to the shift amounts within a predetermined length, since the correction values are calculated based on the shift amounts smaller than the maximum shift amount in absolute values, an excessive correction can be prevented, thereby to improve printing quality.

10 Claims, 16 Drawing Sheets

(56) References Cited

U.S. PATENT DOCUMENTS

| | | | |
|---|---|---|---|
| 2008/0211854 A1 | 9/2008 | Takahashi et al. | |
| 2010/0033525 A1 | 2/2010 | Kunihiro | |
| 2015/0273887 A1* | 10/2015 | Kurokawa | B41J 2/2135 347/19 |
| 2016/0279928 A1 | 9/2016 | Morizono et al. | |

FOREIGN PATENT DOCUMENTS

| | | |
|---|---|---|
| JP | 2001-162912 A | 6/2001 |
| JP | 2007-264238 A | 10/2007 |
| JP | 2008-188841 A | 8/2008 |
| JP | 2010-58503 A | 3/2010 |
| JP | 2016-185673 A | 10/2016 |
| JP | 2019-069625 A | 5/2019 |
| JP | 2019-136949 A | 8/2019 |

OTHER PUBLICATIONS

Japanese Decision to Grant a Patent issued in corresponding Japanese Patent Application No. 2019-176994, dated Jan. 24, 2023, with English translation.

Extended European Search Report issued in corresponding European Patent Application No. 20868474.6-1014, dated Aug. 23, 2023.

International Search Report issued in corresponding International Patent Application No. PCT/JP2020/024379, dated Jul. 28, 2020, with English translation.

* cited by examiner

PRINTING APPARATUS AND A PRINTING METHOD

CROSS REFERENCE

This application is the U.S. National Phase under 35 U.S.C. § 371 of International Application No. PCT/JP2020/024379, filed on Jun. 22, 2020, which claims the benefit of Japanese Application No. 2019-176994, filed on Sep. 27, 2019, the entire contents of each are hereby incorporated by reference.

TECHNICAL FIELD

This invention relates to a printing apparatus and a printing method for performing printing with a plurality of print heads arranged at intervals in a transport direction of a printing medium, and more particularly relates to a technique for correcting image shift amounts which are shifting (also called misregister) of images affecting printing quality.

BACKGROUND ART

Conventionally, a known apparatus of this type includes four print heads, an image pickup unit, a printing controller, and a correcting unit (see Patent Document 1, for example). The four print heads are arranged separately in a transport direction of web paper. The image pickup unit photographs the web paper printed by the print heads. The printing controller, while transporting the web paper in the transport direction of the web paper, operates each print head to print a shift amount detecting chart on the web paper. This is done by causing a print head acting as reference to form a plurality of first line segments at predetermined intervals in the transport direction, and causing a print head different from the reference print head to form a plurality of second line segments in the areas of the plurality of first line segments and at intervals varied toward upstream and downstream sides of the transport direction. The chart reflects density peak positions according to shift amounts of printing timing between the print head acting as reference and the objective print head. The correcting unit has the shift amount detecting chart photographed by the image pickup unit, determines shift amounts and based on density peak positions in the shift amount detecting chart, and corrects the printing timing between the print heads by the shift amounts.

PRIOR ART DOCUMENT

Patent Document

[Patent Document 1]
Unexamined Patent Publication No. 2019-69625

SUMMARY OF INVENTION

Technical Problem

However, the conventional example with such construction has the following problem. The printing apparatus includes various types of drivers, movable components, and so on, and due to the various types of drivers, movable components, and so on, it is a general tendency of the apparatus to be subject to temporal variations regarding the transporting speed of web paper, printing timing, and so on. Therefore, even if correction is made only with the shift amount detecting chart reflecting the shift amounts at a certain point of time, the shifts cannot be corrected accurately, thus leaving a problem that printing quality cannot be improved. For example, where a shift amount has a certain time range of variations, and where a maximum shift amount in that range of variations is determined from the shift amount detecting chart, a correction made based on the shift amount will be an excessive correction, and thus no improvement in printing quality can be expected.

This invention has been made having regard to the state of the art noted above, and its object is to provide a printing apparatus and a printing method which can improve printing quality by preventing an excessive correction even when temporal variations occur in shift amounts.

Solution to Problem

To fulfill the above object, this invention provides the following construction.

The invention defined in claim 1 provides a printing apparatus for printing on a printing medium, comprising a transport device for transporting the printing medium in a transport direction; a plurality of print heads arranged separately in the transport direction for printing on the printing medium; a shift amount detecting chart forming device for forming a shift amount detecting chart on the printing medium, the shift amount detecting chart including a middle chart printed in a middle portion of the printing medium in a primary scanning direction perpendicular to the transport direction, and having a first line segment group of first line segments formed as arranged at constant intervals over a predetermined length in the transport direction, and having a long side in the primary scanning direction, by a reference print head serving as reference position in the transporting direction among the plurality of print heads, and a second line segment group of second line segments formed by an objective print head disposed separately in the transport direction from the reference print head among the plurality of print heads, to have a long side in the primary scanning direction, and located in a middle in the transport direction between the first line segments, or at centers in the transport direction of the first line segments; one-side peripheral charts formed separately on one side in the primary scanning direction from the middle chart, with the intervals in the transport direction of the first line segments and the second line segments in the middle chart gradually widening, progressively toward the end in the primary scanning direction; and other side peripheral charts formed separately on the other side in the primary scanning direction from the middle chart direction, with the intervals in the transport direction of the first line segments and the second line segments in the middle chart gradually narrowing, progressively toward the end in the primary scanning direction; an image pickup device for photographing the shift amount detecting chart printed on the printing medium; a calculating device, with reference to the shift amount detecting chart photographed by the image pickup device, and based on a variation trace of density peak positions in the primary scanning direction within the predetermined length, for calculating correction values from shift amounts smaller than a maximum shift amount in absolute values in the shift amount detecting chart; and a correcting device for correcting printing timing of the objective print head relative to the reference print head with the correction values.

[Functions and effects] According to the invention defined in claim 1, the shift amount detecting chart forming device forms a shift amount detecting chart on the printing medium transported by the transport device, and the image pickup device photographs the shift amount detecting chart. Unless shifting occurs to printing timing, the shift amount detecting chart has density peak positions existing in the middle chart. When shifting occurs to the printing timing, within the predetermined length in the shift amount detecting chart, the density peak positions existing in the middle chart are reflected in the one-side peripheral charts or the other side peripheral charts according to the shift amounts. As a result, the variations of shift amount are printed in the shift amount detecting chart as a trace of the density peak positions. The calculating device, based on the variation trace of the density peak positions from the shift amount detecting chart photographed by the image pickup device, calculates correction values based on shift amounts smaller than a maximum shift amount in absolute values. The correcting device corrects the printing timing with these correction values. Consequently, even when temporal variations occur to the shift amounts within the predetermined length, since the correction values are taken from the shift amounts smaller than the maximum shift amount in absolute values, an excessive correction can be prevented, thereby to improve printing quality.

In this invention, it is preferred that the calculating device is configured to determine the correction values based on a frequency of occurrence of the shift amounts (claim 2).

With the correction values determined based on the frequency of occurrence of the shift amounts, the apparatus can be less vulnerable to the influence of noise. Consequently, even in the presence of outliers, an excessive correction can prevented, to realize calculation of more appropriate correction values.

In this invention, it is preferred that the calculating device is configured to determine the correction values in a way to minimize a sum total of the shift amounts after correction (claim 3).

Since what minimizes a sum total of the shift amounts after correction, an excessive correction can prevented.

In this invention, it is preferred that the printing apparatus further comprises an extracting device for extracting frequency versus intensity of the density peak positions in the predetermined length about the shift amount detecting chart; and an output device for outputting information including peak positions of the frequency (claim 4).

A printing apparatus includes a plurality of parts serving as factors that cause temporal variations in shift amounts. For example, temporal variations occur by factors such as misalignment of drive rollers and the number of passages the rolling elements of the bearings of transport rollers. Furthermore, peak positions of frequency in frequency versus intensity of the density peak positions and the factors have a relatively strong correlation therebetween. It is therefore possible to guess to some extent the factors of temporal variations in shift amounts by extracting frequency versus intensity with the extracting device, and outputting information including the peak positions of frequency with the output device. Thus, countermeasures such as suppressing the temporal variations in shift amounts can be taken efficiently, thereby further improving printing quality.

In this invention, it is preferred that the predetermined length corresponds to one cycle of temporal variations of shift amounts measured beforehand (claim 5).

Generally, the size and cycle of temporal variations of the shift amounts vary from each individual to another of the printing apparatus. Then, one cycle of temporal variations of the shift amounts may be measured beforehand, and the shift amount detecting chart may be formed on the printing medium covering the predetermined length which corresponds to the cycle. Thus, the correction values can be calculated appropriately.

The invention defined in claim 6 provides a printing method for printing on a printing medium, comprising a shift amount detecting chart forming step for forming a shift amount detecting chart on the printing medium, the shift amount detecting chart including a middle chart printed in a middle portion of the printing medium in a primary scanning direction perpendicular to the transport direction, and having a first line segment group of first line segments formed as arranged at constant intervals over a predetermined length in the transport direction, and having a long side in the primary scanning direction, by a reference print head serving as reference position in the transporting direction among a plurality of print heads arranged separately in the transport direction for printing on the printing medium, and a second line segment group of second line segments formed by an objective print head disposed separately in the transport direction from the reference print head among the plurality of print heads, to have a long side in the primary scanning direction, and located in a middle in the transport direction between the first line segments, or at centers in the transport direction of the first line segments; one-side peripheral charts formed separately on one side in the primary scanning direction from the middle chart, with the intervals in the transport direction of the first line segments and the second line segments in the middle chart gradually widening, progressively toward the end in the primary scanning direction; and other side peripheral charts formed separately on the other side in the primary scanning direction from the middle chart direction, with the intervals in the transport direction of the first line segments and the second line segments in the middle chart gradually narrowing, progressively toward the end in the primary scanning direction; an image pickup step for photographing the shift amount detecting chart printed on the printing medium; a correction value calculating step, with reference to the shift amount detecting chart photographed by the image pickup device, and based on a variation trace of density peak positions in the primary scanning direction within the predetermined length, for calculating correction values from shift amounts smaller than a maximum shift amount in absolute values in the shift amount detecting chart; and a correcting step for correcting printing timing of the objective print head relative to the reference print head with the correction values.

[Functions and effects] According to the invention defined in claim 6, the shift amount detecting chart forming step forms a shift amount detecting chart on the printing medium, and the image pickup step photographs the shift amount detecting chart. Unless shifting occurs to printing timing, the shift amount detecting chart has density peak positions existing in the middle chart. When shifting occurs to the printing timing, within the predetermined length in the shift amount detecting chart, the density peak positions existing in the middle chart are reflected in the one-side peripheral charts or the other side peripheral charts according to the shift amounts. As a result, the variations of shift amount are printed in the shift amount detecting chart as a trace of the density peak positions. The shift amount calculating step, based on the variation trace of the density peak positions from the shift amount detecting chart photographed in the image pickup step, calculates correction values based on shift amounts smaller than a maximum shift amount in absolute values. The shift amount correcting step corrects the printing timing with these correction values. Consequently, even when temporal variations occur to the shift amounts within the predetermined length, since the correction values are taken from the shift amounts smaller than the maximum shift amount in absolute values, an excessive correction can be prevented, thereby to improve printing quality.

Advantageous Effects of Invention

According to the printing apparatus in this invention, the shift amount detecting chart forming device forms a shift amount detecting chart on the printing medium transported by the transport device, and the image pickup device photographs the shift amount detecting chart. Unless shifting occurs to printing timing, the shift amount detecting chart has density peak positions existing in the middle chart. When shifting occurs to the printing timing, within the predetermined length in the shift amount detecting chart, the density peak positions existing in the middle chart are reflected in the one-side peripheral charts or the other side peripheral charts according to the shift amounts. As a result, the variations of shift amount are printed in the shift amount detecting chart as a trace of the density peak positions. The calculating device, based on the variation trace of the density peak positions from the shift amount detecting chart photographed by the image pickup device, calculates correction values based on shift amounts smaller than a maximum shift amount in absolute values. The correcting device corrects the printing timing with these correction values. Consequently, even when temporal variations occur to the shift amounts within the predetermined length, since the correction values are taken from the shift amounts smaller than the maximum shift amount in absolute values, an excessive correction can be prevented, thereby to improve printing quality.

DESCRIPTION OF EMBODIMENTS

One embodiment of this invention will be described hereinafter with reference to the drawings.

Figure 1:
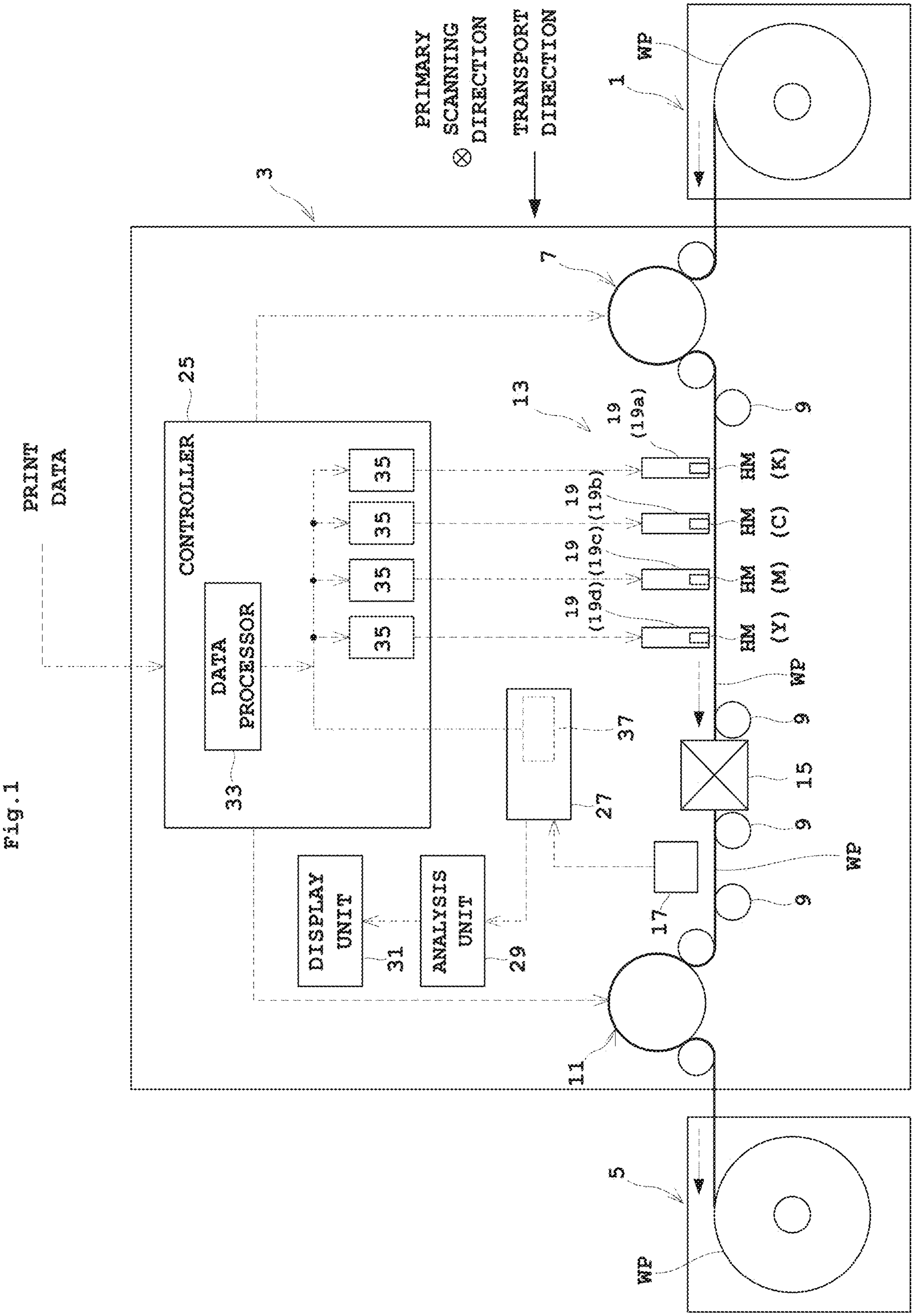
FIG. 1 is an outline schematic view showing an entire inkjet printing system according to an embodiment.
Figure 2:
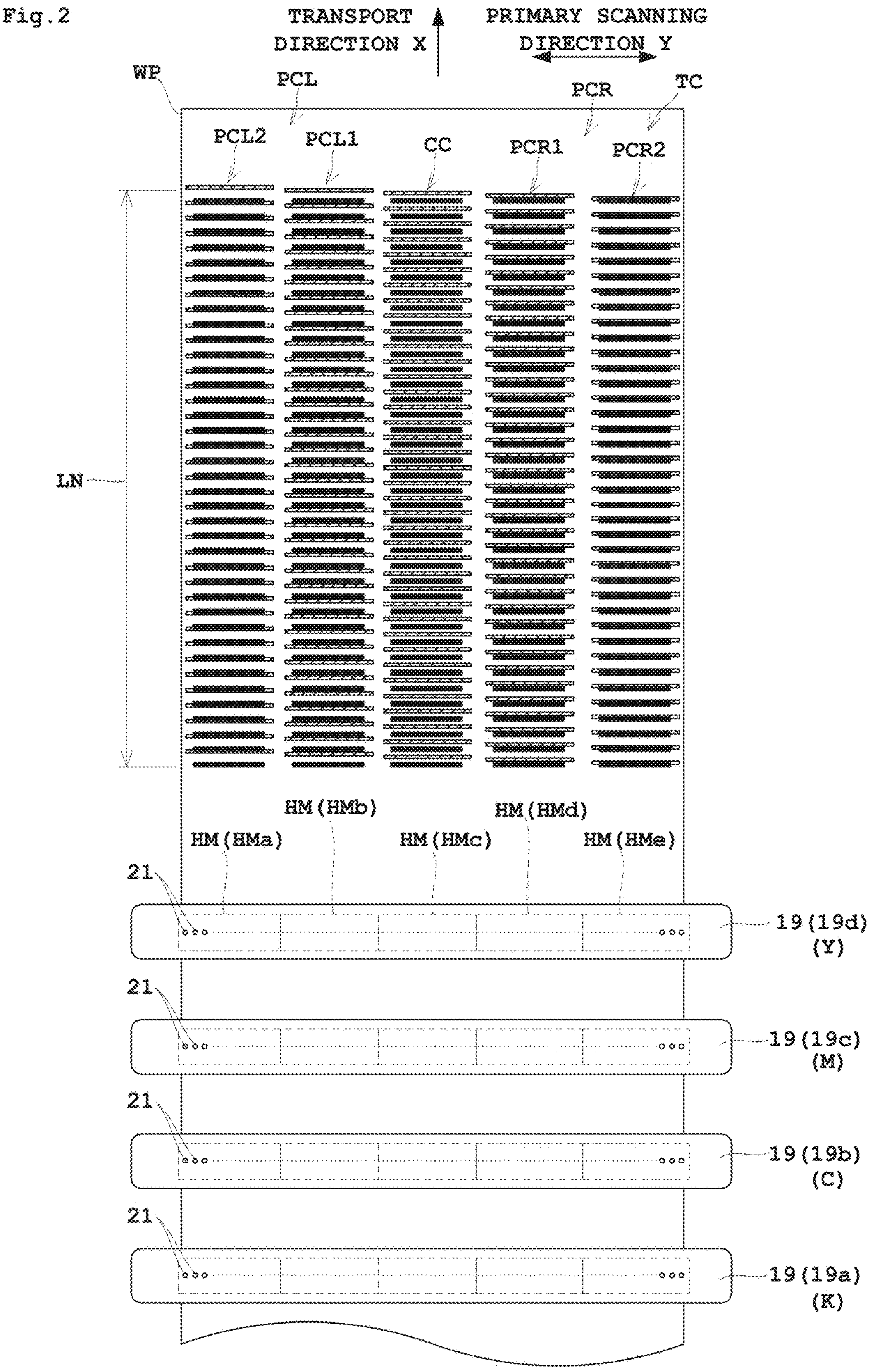
FIG. 2 is a schematic view showing a positional relationship in plan view between each print head and web paper.

FIG. 1 is an outline schematic view showing an entire inkjet printing system according to the embodiment. FIG. 2 is a schematic view showing a positional relationship in plan view between each print head and web paper.

The inkjet printing system according to this embodiment includes a paper feeder 1, an inkjet printing apparatus 3 and a takeup roller 5.

The paper feeder 1 holds long web paper WP in a roll form to be rotatable about a horizontal axis, and unwinds and feeds the web paper WP to the inkjet printing apparatus 3. The takeup roller 5 takes up on a horizontal axis the web paper WP printed in the inkjet printing apparatus 3. Referring to the side of feeding the web paper WP as upstream and that of discharging the web paper WP as downstream, the paper feeder 1 is located upstream of the inkjet printing apparatus 3, and the takeup roller 5 downstream of the inkjet printing apparatus 5.

The inkjet printing apparatus 3 includes a drive roller 7 disposed in an upstream position for taking in the web paper WP from the paper feeder 1. A plurality of transport rollers 9 are arranged along a transport direction X downstream of the drive roller 7. The web paper WP unwound from the paper feeder 1 by the drive roller 7 is transported downstream along the plurality of transport rollers 9 toward the takeup roller 5. A drive roller 11 is disposed between the most downstream transport roller 9 and the takeup roller 5. The drive roller 11 transports in the transport direction X the web paper WP transported on the transport rollers 9 and feeds it forward toward the takeup roller 5.

The above web paper WP corresponds to the "printing medium" in this invention. The drive rollers 9 and 11 and transport rollers 9 correspond to the "transport device" in this invention. The inkjet printing apparatus 3 corresponds to the "printing apparatus" in this invention.

The inkjet printing apparatus 3 includes, between the drive roller 7 and drive roller 11, a printing unit 13, a dryer 15, and an image pickup unit 17 arranged in the stated order from upstream.

The dryer 15 dries portions of the web paper WP printed by the printing unit 13. The image pickup unit 17 checks whether the portions of the web paper WP printed as products by the printing unit 13 have stains, omissions or other defects, photographs shift amount detecting charts described hereinafter, which are different from product prints, and acquires image data corresponding to the shift amount detecting charts.

The printing unit 13 has a plurality of print heads 19 for dispensing ink droplets, which are arranged in the transport direction X as separated from one another by a known distance. This embodiment will be described taking a construction having four print heads 19, for example. Here, the print heads 19 will be labeled print head 19*a*, print head 19*b*, print head 19*c*, and print head 19*d* in order from upstream.

In the following description, when the print heads 19 need to be distinguished, alphabetical signs (such as "a") will be affixed to numerical sign 19, but when it is not necessary to distinguish them, only sign 19 will be used. Each print head 19 has a plurality of head modules HM arranged linearly in a primary scanning direction Y perpendicular to the transport direction X. It is assumed here that each print head 19 has five head modules HM, for example. Each head module HM has a plurality of nozzles 21 formed in a surface thereof opposed to the web paper WP for dispensing ink droplets, respectively. The plurality of nozzles 21 of each head module HM are formed in rows extending in the primary scanning direction Y, and each head module HM is constructed integrally with the plurality of nozzles 21. Here, when the five head modules HM need to be identified individually, they will be referred to as head modules HMa, HMb, HMc, HMd, and HMe in order from left in the plan view of FIG. 2.

The above four print heads 19*a*-19*d* dispense ink droplets in at least two colors, for example, to enable multicolor printing on the web paper WP. Here, for example, the print head 19*a* dispenses black (K) ink, the print head 19*b* dispenses cyan (C) ink, the print head 19*c* dispenses magenta (M) ink, and the print head 19*d* dispenses yellow (Y) ink.

The above four print heads 19 correspond to the "plurality of print heads" in this invention.

The inkjet printing apparatus 3 includes a controller 25, an image processor 27, an analysis unit 29, and a display unit 31.

The controller 25 has a CPU and a memory not shown, and is constructed of a data processor 33, drive boards 35, and so on. The drive boards 35 are, for example, provided for the respective print heads 19*a*-19*d*, and thus the respective head modules HMa-HMe of the print heads 19. The drive boards 35, in response to given signals, control dispensation timing and dispensation amounts of ink droplets from the nozzles 21.

The controller 25 receives print data from a host computer not shown, and controls creation of prints, for example. Specifically, the data processor 33 processes the print data received according to the specifications of the printing unit 13 and drive boards 35. This process includes density adjustment and half-toning process, for example. The controller 25, when outputting signals to each drive board 35 according to data processed by the data processor 33, reads correction values from a correction value memory 37 included in the image processor 27, and corrects printing timing by adjusting the dispensation timing of ink droplets. Further, the controller 25 receives, as printing data, shift amount detecting charts described hereinafter from the host computer or other external source, and outputs signals to each drive board 35 based on the data of the shift amount detecting charts processed by the data processor 33. The controller 25 may also have shift amount detecting charts described hereinafter stored beforehand, and output signals to each drive board 35 based on the data of the shift amount detecting charts processed by the data processor 33. The controller 25 also controls rotation of the drive rollers 7 and 11.

The image processor 27 performs image processing of the image data acquired by the image pickup unit 17 and corresponding to the shift amount detecting charts described hereinafter. Further, the image processor 27 determines a variation trace of the highest or lowest density peak position in the primary scanning direction Y within a predetermined length LN and, based on the variation trace, calculates shift amounts smaller than a maximum shift amount in the absolute values of the density peak position in the shift amount detecting chart. These shift amounts also include a shift amount ±0 for no shift. Then, the image processor 27 stores the calculated shift amounts as correction values in the correction value memory 37.

The above predetermined length LN preferably is, for example, one cycle of temporal variations of the shift amount in this inkjet printing system. In view of individual differences existing among inkjet printing systems, it is preferable that the predetermined length LN is determined based on the time for which variations occur to shift amount and for which measurement is carried out beforehand for each system. When there is no clear periodicity in the temporal variations of shift amount, the predetermined length LN may be a maximum printing length of product prints, for example.

The analysis unit 29 analyzes the variation trace of the density peak positions in the primary scanning direction Y within the predetermined length LN provided by the image processor 27, and extracts frequency versus intensity. Preferably, the analysis unit 29 extracts the frequency versus intensity, using FFT (Fast Fourier Transform), for example. This can extract the frequency versus intensity efficiently.

The display unit 31 displays information including the frequency's peak positions based on the frequency versus intensity extracted by the analysis unit 29. The display unit 31 is a liquid crystal display panel, or organic EL panel, for example, and may be any display device as long as it can display graphs of frequency versus intensity.

The above-noted controller 25 corresponds to the "shift amount detecting chart forming device" and "correcting device" in this invention. The image pickup unit 17 corresponds to the "image pickup device" in this invention. The image processor 27 corresponds to the "calculating device" in this invention. The analysis unit 29 corresponds to the "extracting device" in this invention. The display unit 31 corresponds to the "display device" in this invention.

Figure 3:
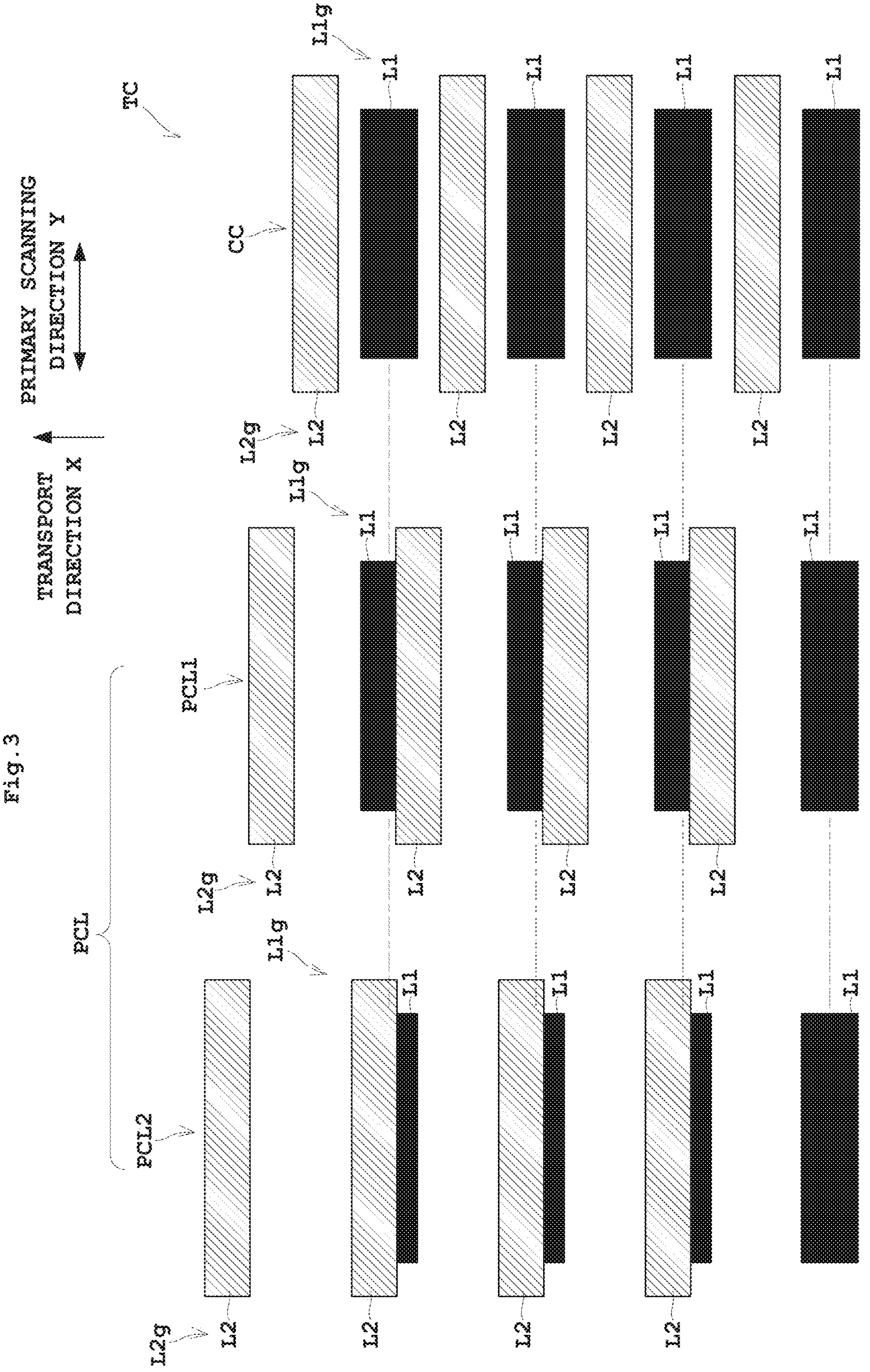
FIG. 3 is a schematic view showing a middle chart and part of one-side peripheral charts of a shift amount detecting chart.
Figure 4:
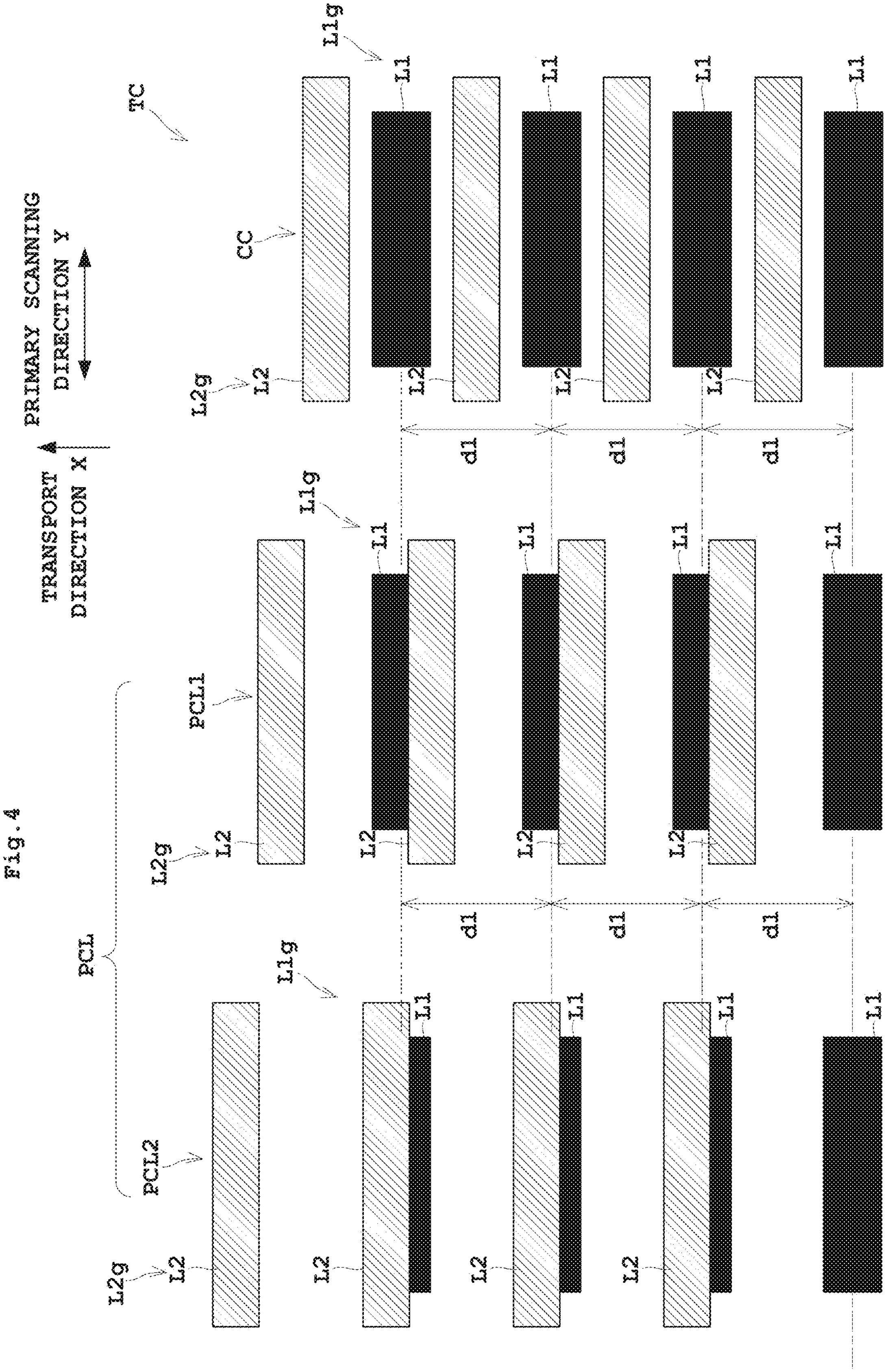
FIG. 4 is a schematic view showing the middle chart and part of the one-side peripheral charts of the shift amount detecting chart.
Figure 5:
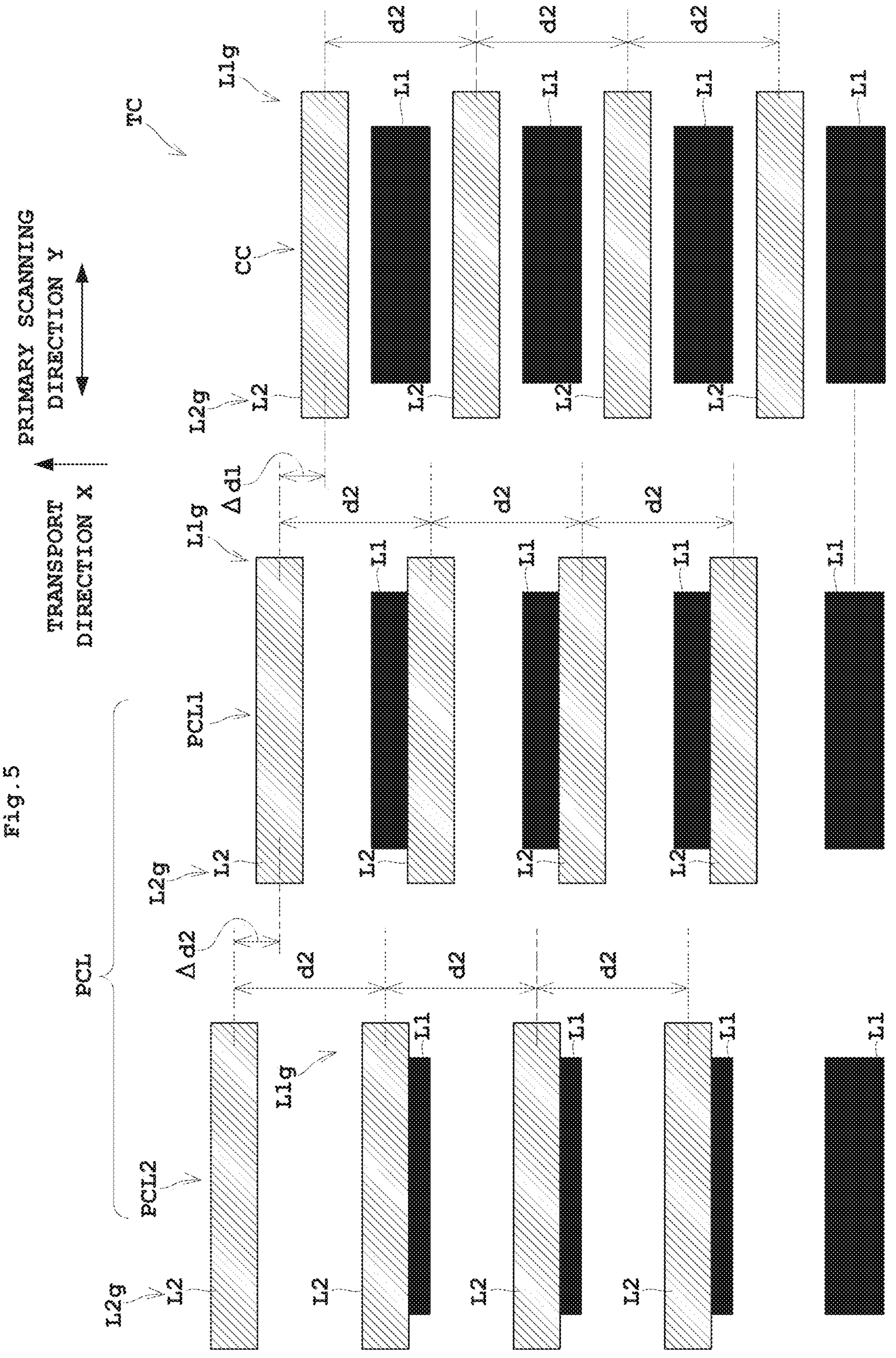
FIG. 5 is a schematic view showing the middle chart and part of the one-side peripheral charts of the shift amount detecting chart.
Figure 6:
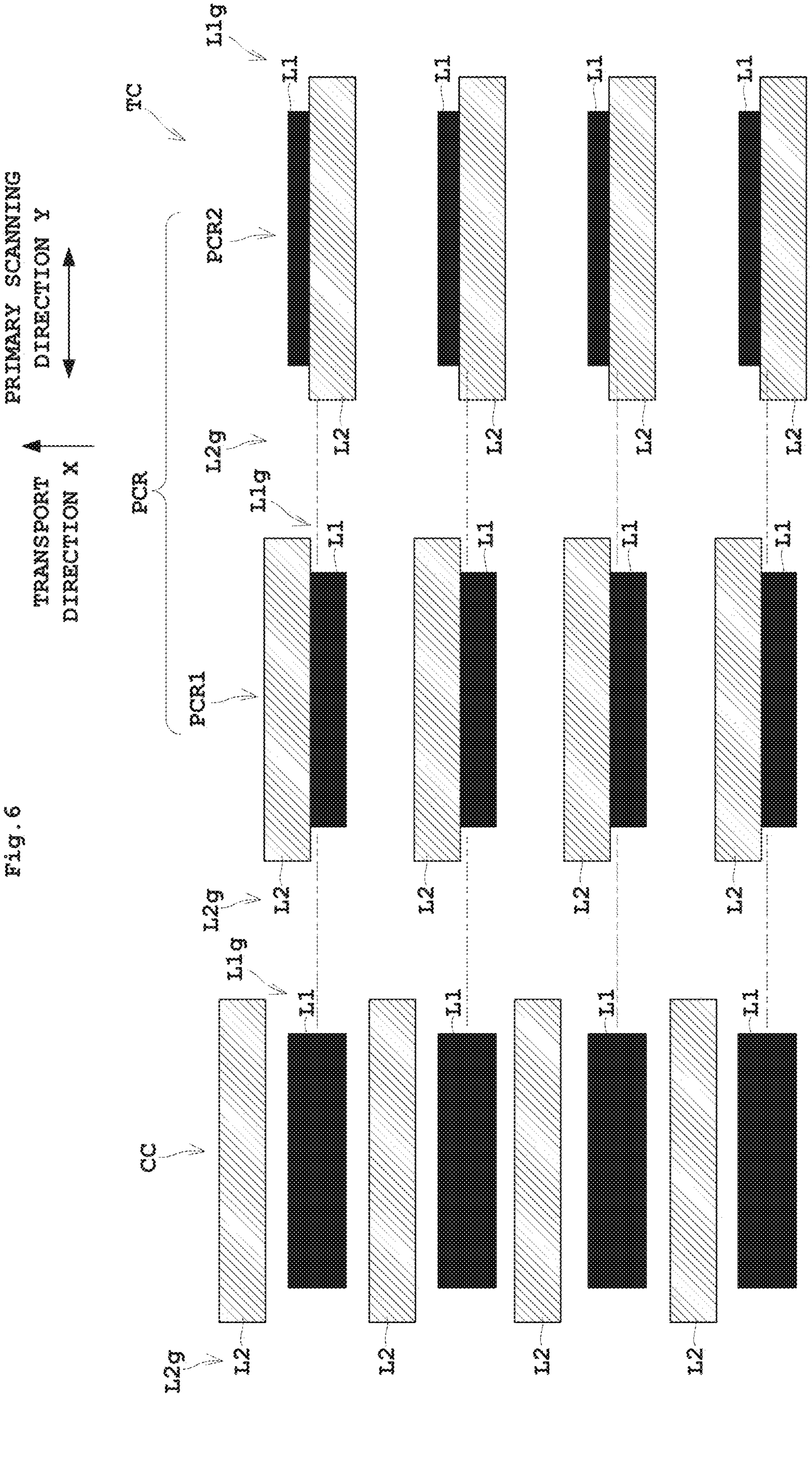
FIG. 6 is a schematic view showing the middle chart and part of other side peripheral charts of the shift amount detecting chart.
Figure 7:
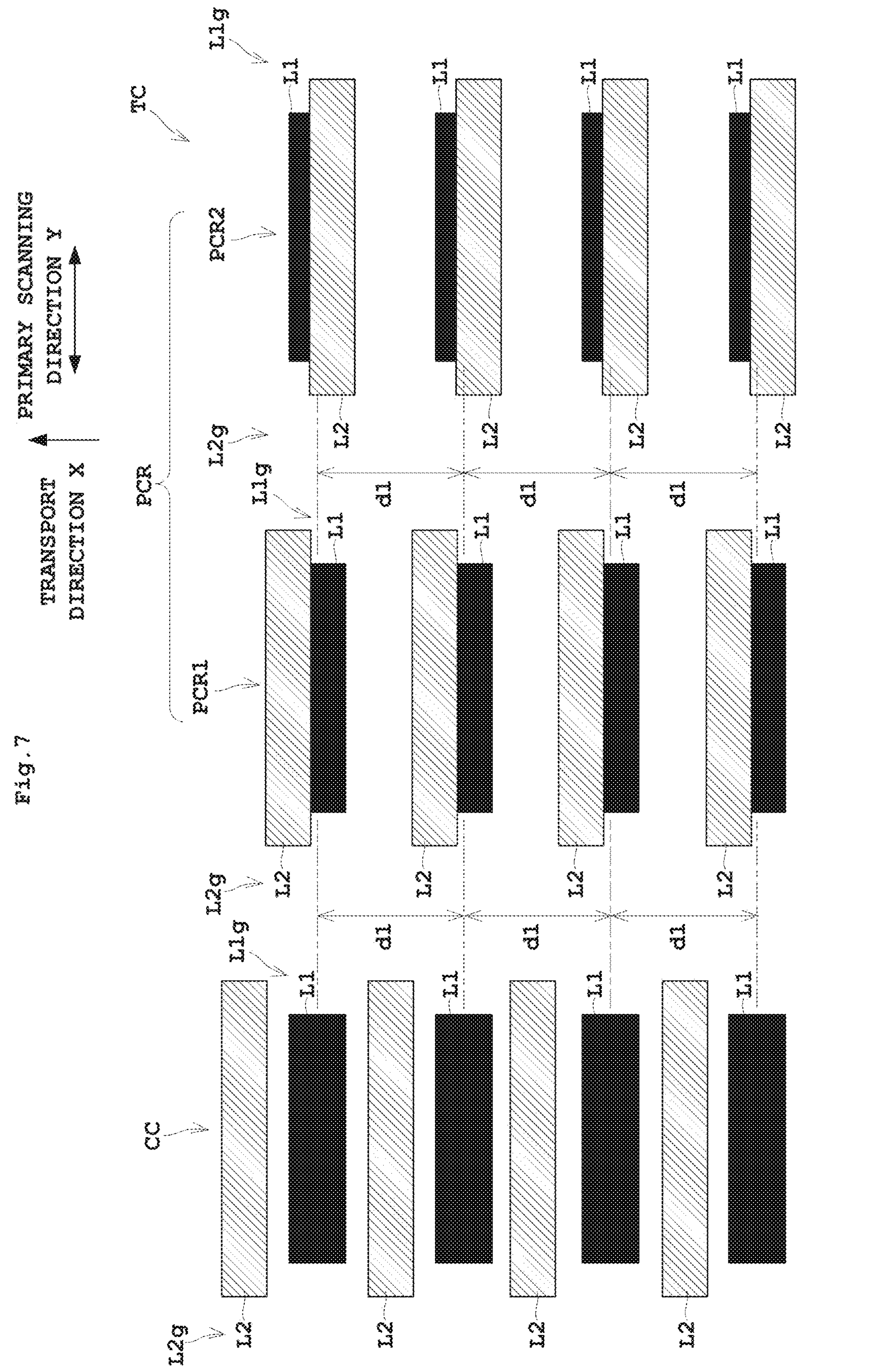
FIG. 7 is a schematic view showing the middle chart and part of the other side peripheral charts of the shift amount detecting chart.
Figure 8:
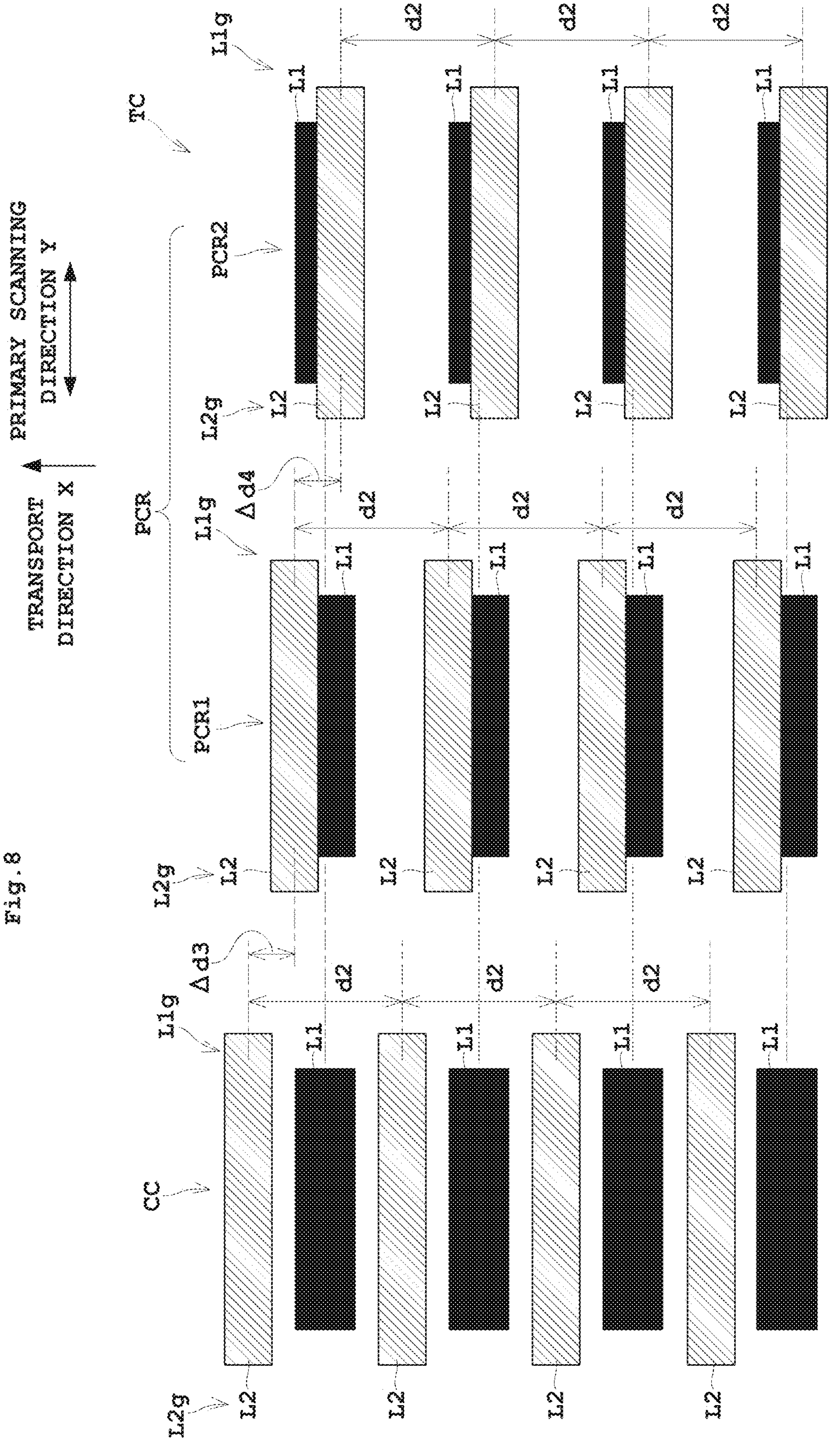
FIG. 8 is a schematic view showing the middle chart and part of the other side peripheral charts of the shift amount detecting chart.

The shift amount detecting chart will now be described with reference to FIGS. 3-8 in addition to FIG. 2. FIGS. 3-5 are schematic views showing a middle chart and part of one-side peripheral charts of a shift amount detecting chart. FIGS. 6-8 are schematic views showing the middle chart and part of other side peripheral charts of the shift amount detecting chart.

As shown in FIG. 2, a shift amount detecting chart TC includes a middle chart CC formed in a middle portion in the primary scanning direction Y. One-side peripheral charts PCL are formed on a left side which is one side of the middle chart CC in the primary scanning direction Y. Other side peripheral charts PCR are formed on a right side which is the other side of the middle chart CC in the primary scanning direction Y. In this example, as shown in FIG. 3, two one-side peripheral charts PCL (first one-side peripheral chart PCL1 and second one-side peripheral chart PCL2) are formed. As shown in FIG. 6, two other side peripheral charts PCR (first other side peripheral chart PCR1 and second other side peripheral chart PCR2) are formed. The shift amount detecting chart TC is formed over the predetermined length LN in the transport direction X.

The middle chart CC includes a first line segment group L1*g* having a plurality of first line segments L1 formed, and a second line segment group L2*g* having a plurality of second line segments L2 formed. The first line segment group L1*g* is formed by a print head 19 acting as printing reference, e.g. the print head 19*a*. The second line segment group L2*g* is printed by the print head 19*b* which is different from the print head 19*a* acting as reference.

Specifically, the first line segment group L1*g* of the middle chart CC has the first line segments L1 with long sides in the primary scanning direction Y and short sides in the transport direction X, which are formed at predetermined constant intervals in the transport direction X. The middle chart CC includes the second line segments L2 with long sides longer than the first line segments L1 and short sides slightly shorter than the short sides of the first line segments L1, which are formed and arranged in the middle between the first line segments L1 in the transport direction X.

The above print head 19*a* corresponds to the "reference print head" in this invention. The print head 19*b* corresponds to the "objective print head" in this invention.

The first one-side peripheral chart PCL1 and second one-side peripheral chart PCL2 are formed to be spaced leftward in the primary scanning direction Y from the middle chart CC, and also to be spaced from each other in the primary scanning direction Y. The first one-side peripheral chart PCL1 and second one-side peripheral chart PCL2 have first line segment groups L1*g* formed in the same positions in the transport direction X as the first line segment group L1*g* of the middle chart CC. Further, the first one-side peripheral chart PCL1 and second one-side peripheral chart PCL2 have second line segment groups L2*g* which, however, are formed in positions different between the first one-side peripheral chart PCL1 and second one-side peripheral chart PCL2. That is, the first one-side peripheral chart PCL1 close to the middle chart CC has the second line segments L2 formed at wider intervals downstream in the transport direction X from the first line segments L1 than the intervals between the first line segments L1 and second line segments L2 of the middle chart CC. The second one-side peripheral chart PCL2 far from the middle chart CC has the second line segments L2 formed at wider intervals downstream in the transport direction X from the first line segments L1 than the intervals between the first line segments L1 and second line segments L2 of the first one-side peripheral chart PCL1. In other words, the one-side peripheral charts PCL have the first line segments L1 and the second line segments L2 downstream thereof formed at intervals gradually widening, progressively toward an end of the one side in the primary scanning direction Y from the middle chart CC.

The first other side peripheral chart PCR1 and second other side peripheral chart PCR2 are formed to be spaced rightward in the primary scanning direction Y from the middle chart CC, and also to be spaced from each other in the primary scanning direction Y. The first other side peripheral chart PCR1 and second other side peripheral chart PCR2 are different from the first one-side peripheral chart PCL1 and second one-side peripheral chart PCL2 in that second line segments L2 located downstream in the transport direction X from first line segments L1 have reduced intervals relative to the first line segments L1.

That is, the first other side peripheral chart PCR1 close to the middle chart CC has the second line segments L2 formed at narrower intervals downstream in the transport direction X from the first line segments L1 than the intervals between the first line segments L1 and second line segments L2 of the middle chart CC. The second other side peripheral chart PCR2 far from the middle chart CC has the second line segments L2 formed at narrower intervals downstream in the transport direction X from the first line segments L1 than the intervals between the first line segments L1 and second line segments L2 of the first other side peripheral chart PCR1.

In other words, the other side peripheral charts PCR have the first line segments L1 and the second line segments L2 downstream thereof formed at intervals gradually narrowing, progressively toward an end of the other side in the primary scanning direction Y from the middle chart CC, Next, the construction of the shift amount detecting chart TC will be described in detail using FIGS. 4 and 5. FIG. 4 shows the middle chart CC, first one-side peripheral chart PCL1, and second one-side peripheral chart PCL2, which is a figure for particularly describing the first line segment groups L1*g* in detail.

The first line segment group L1*g* of the middle chart CC consists of a plurality of first line segments L1. These first line segments L1 are formed by the head module HMc located in the middle in the primary scanning direction of the print head 19*a* which dispenses K color ink, The plurality of first line segments L1 of the middle chart CC are spaced from one another at uniform centerline intervals d1 in the transport direction X.

The first line segment group L1*g* of the first one-side peripheral chart PCL1 consists of a plurality of first line segments L1. These first line segments L1 are formed by driving the head module HMb in the print head 19*a* which dispenses K color ink, with the same timing as the head module HMc. The plurality of first line segments L1 of the first one-side peripheral chart PCL1 are spaced from one another at uniform centerline intervals d1 in the transport direction X.

The first line segment group L1*g* of the second one-side peripheral chart PCL2 consists of a plurality of first line segments L1. These first line segments L1 are formed by driving the head module HMa in the print head 19*a* which dispenses K color ink, with the same timing as the head modules HMc and HMb. The plurality of first line segments L1 of the second one-side peripheral chart PCL2 are spaced from one another at uniform centerline intervals d1 in the transport direction X.

FIG. 5 shows the middle chart CC, first one-side peripheral chart PCL1, and second one-side peripheral chart PCL2, which is a figure for particularly describing the second line segment groups L2*g* in detail.

The second line segment group L2*g* of the middle chart CC consists of a plurality of second line segments L2. These second line segments L2 are formed by the head module HMc located in the middle in the primary scanning direction of the print head 19*c* which dispenses C color ink, The plurality of second line segments L2 of the middle chart CC are spaced from one another at uniform centerline intervals d2 in the transport direction X. Note that the centerline intervals d2 of the second line segment group L2*g* are the same in length as the above-mentioned centerline intervals d1 of the first line segment group L1*g*.

The second line segment group L2*g* of the first one-side peripheral chart PCL1 consists of a plurality of second line segments L2. These second line segments L2 are formed by the head module HMb in the print head 19*c* which dispenses C color ink. The plurality of second line segments L2 of the first one-side peripheral chart PCL1 are spaced from one another at uniform centerline intervals d2 in the transport direction X. However, the head module HMb of the print head 19*c* begins to be driven in advance by advance time t1 of the head module HMc of the print head 19*c*. As a result, the second line segment group L2*g* of the first one-side peripheral chart PCL1 is formed as shifted by distance M1 downstream in the transport direction X from the second line segment group L2*g* of the middle chart CC.

The second line segment group L2*g* of the second one-side peripheral chart PCL2 consists of a plurality of second line segments L2. These second line segments L2 are formed by the head module HMa in the print head 19*c* which dispenses C color ink. The plurality of second line segments L2 of the second one-side peripheral chart PCL2 are spaced from one another at uniform centerline intervals d2 in the transport direction X. However, the head module HMa of the print head 19*c* begins to be driven in advance by advance time t2 of the head module HMb of the print head 19*c*. As a result, the second line segment group L2*g* of the second one-side peripheral chart PCL2 is formed as shifted by distance Δd2 downstream in the transport direction X from the second line segment group L2*g* of the first one-side peripheral chart PCL1.

Note that advance time t1 of the head module HMb relative to the head module HMc of the print head 19*c* is the same as advance time t2 of the head module HMa relative to the head module HMb of the print head 19*c*. Therefore, the above-mentioned distance M1 and distance Δd2 are the same in length.

When the transporting speed of the web paper WP is as designed and shifting time of dispensation timing of the print head 19*b* relative to the print head 19*a* is as designed (hereinafter called "the case of ideal conditions"), each first line segment L1 of the middle chart CC is located exactly in the middle between an adjacent pair of second line segments L2.

Under ideal conditions, each second line segment L2 of the first one-side peripheral chart PCL1 is formed as shifted by distance M1 downstream in the transport direction X from the middle position of the second line segment L2 adjoining in the primary scanning direction Y, and each second line segment L2 of the second one-side peripheral chart PCL2 is formed as further shifted by distance Δd2 downstream in the transport direction X from the middle position of the second line segment L2 adjoining in the primary scanning direction Y.

Next, the construction of the shift amount detecting chart TC will be described in detail using FIGS. 7 and 8.

FIG. 7 shows the middle chart CC and first other side peripheral chart PCR1, and second other side peripheral chart PCR2, which is a figure for particularly describing the first line segment groups L1*g* in detail.

The plurality of first line segments L1 constituting the first line segment group L1*g* of the middle chart CC are spaced from one another at uniform centerline intervals d1 in the transport direction X as described hereinbefore.

The first line segment group L1*g* of the first other side peripheral chart PCR1 consists of a plurality of first line segments L1. These first line segments L1 are formed by driving the head module HMd in the print head 19*a* which dispenses K color ink, with the same timing as the head module HMc. The plurality of first line segments L1 of the first other side peripheral chart PCR1 are spaced from one another at uniform centerline intervals d1 in the transport direction X.

The first line segment group L1*g* of the second other side chart PCR2 consists of a plurality of first line segments L1. These first line segments L1 are formed by driving the head module HMe in the print head 19*a* which dispenses K color ink, with the same timing as the head modules HMc and HMd. The plurality of first line segments L1 of the second other side chart PCR2 are spaced from one another at uniform centerline intervals d1 in the transport direction X.

FIG. 8 shows the middle chart CC and first other side peripheral chart PCR1, and second other side peripheral chart PCR2, which is a figure for particularly describing the second line segment groups L2*g* in detail.

The plurality of second line segments L2 of the middle chart CC are spaced from one another at uniform centerline intervals d2 in the transport direction X. The intervals d2 of the second line segment group L2*g* are the same in length as the intervals of the first line segment group L1*g* noted hereinbefore.

The second line segment group L2*g* of the first other side peripheral chart PCR1 consists of a plurality of second line segments L2. These second line segments L2 are formed by the head module HMd in the print head 19*c* which dispenses C color ink. The plurality of second line segments L2 of the first other side chart PCR1 are spaced from one another at uniform centerline intervals d2 in the transport direction X. However, the head module HMd of the print head 19*c* begins to be driven later by delay time t3 than the head module HMc of the print head 19*c*. As a result, the second line segment group L2*g* of the first other side peripheral chart PCR1 is formed as shifted by distance Δd3 upstream in the transport direction X from the second line segment group L2*g* of the middle chart CC.

The second line segment group L2*g* of the second other side peripheral chart PCR2 consists of a plurality of second line segments L2. These second line segments L2 are formed by the head module HMe in the print head 19*c* which dispenses C color ink. The plurality of second line segments L2 of the second other side peripheral chart PCR2 are spaced from one another at uniform centerline intervals d2. However, the head module HMa of the print head 19*c* begins to be driven later by delay time t4 than the head module HMb of the print head 19*c*. As a result, the second line segment group L2*g* of the second other side peripheral chart PCR2 is formed as shifted by distance Δd4 upstream in the transport direction X from the second line segment group L2*g* of the first other side peripheral chart PCR1.

Note that the delay time t3 of the head module HMd relative to the head module HMc of the print head 19*c* is the same as the delay time t4 of the head module HMe relative to the head module HMd of print head 19*c*. Therefore, distance Δd3 and distance Δd4 are the same in length.

Under ideal conditions, each second line segment L2 of the first other side peripheral chart PCR1 is formed as shifted by distance Δd3 upstream in the transport direction X from the middle position of the second line segment L2 adjoining in the primary scanning direction Y, and each second line segment L2 of the second other side peripheral chart PCR2 is formed as further shifted by distance Δd4 upstream in the transport direction X from the middle position of the second line segment L2 adjoining in the primary scanning direction Y.

Figure 9:
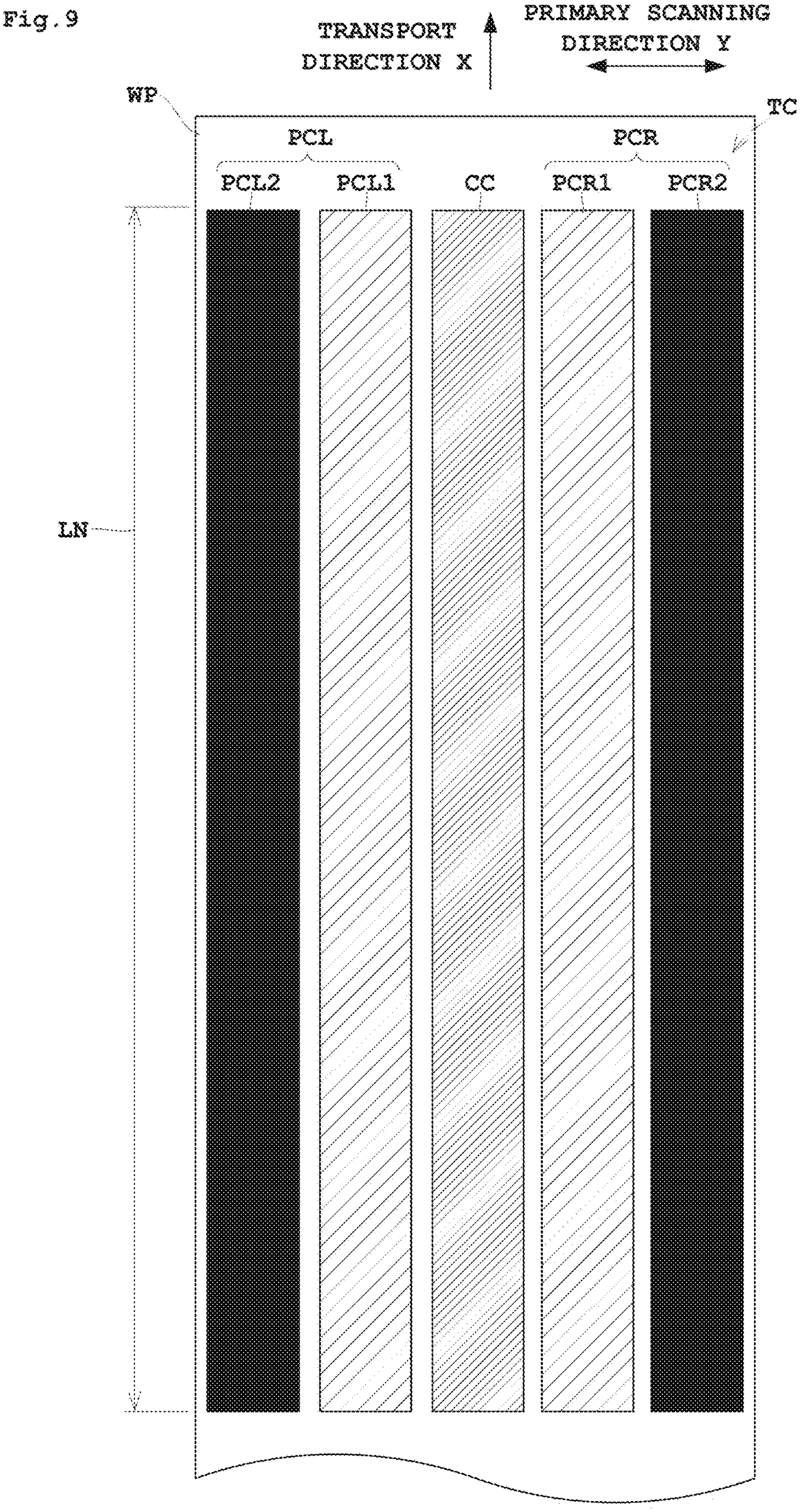
FIG. 9 is a schematic view showing the shift amount detecting chart printed on the web paper in a state where ideal conditions continue.

Reference is now made to FIG. 9. FIG. 9 is a schematic view showing the shift amount detecting chart TC printed on the web paper WP in a state where ideal conditions continue.

When the head modules HM of the print head 19*a* and print head 19*b* are driven under the timing control noted hereinbefore while transporting the web paper WP at ideal speed, the results may be the shift amount detecting chart TC shown in FIG. 9, for example. That is, the middle chart CC, since there is no overlap of the first line segments L1 and second line segments L2, has the color of the second line segments L2 in the densest color thereof, which is the color of cyan (C) in this example. Especially since the length of the long sides of the second line segments L2 is formed longer than the long sides of the first line segments L1, the density of cyan (C) can be formed in increased density. On the other hand, the first line segments L1 in black (K) overlap the second line segments L2 in cyan (C) in increasing degrees toward the peripheral areas in the primary scanning direction Y, and this reduces the color of cyan (C) and makes the color of black (K) densest.

Regarding the area not hidden by a first line segment L1 between a pair of second line segments L2 adjoining in the transport direction X (hereinafter called "blank area"), the middle chart CC is the smallest, the next are the first one-side peripheral chart PCL1 and first other side peripheral chart PCR1, and the second next are the second one-side peripheral chart PCL2 and second other side peripheral chart PCR2. Consequently, when seen macroscopically, the shift amount detecting chart TC printed under ideal conditions has the middle chart CC with the highest density, the first one-side peripheral chart PCL1 and first other side peripheral chart PCR1 with a density lower than that, and the second one-side peripheral chart PCL2 and second other side peripheral chart PCR2 with a still lower density.

Figure 10:
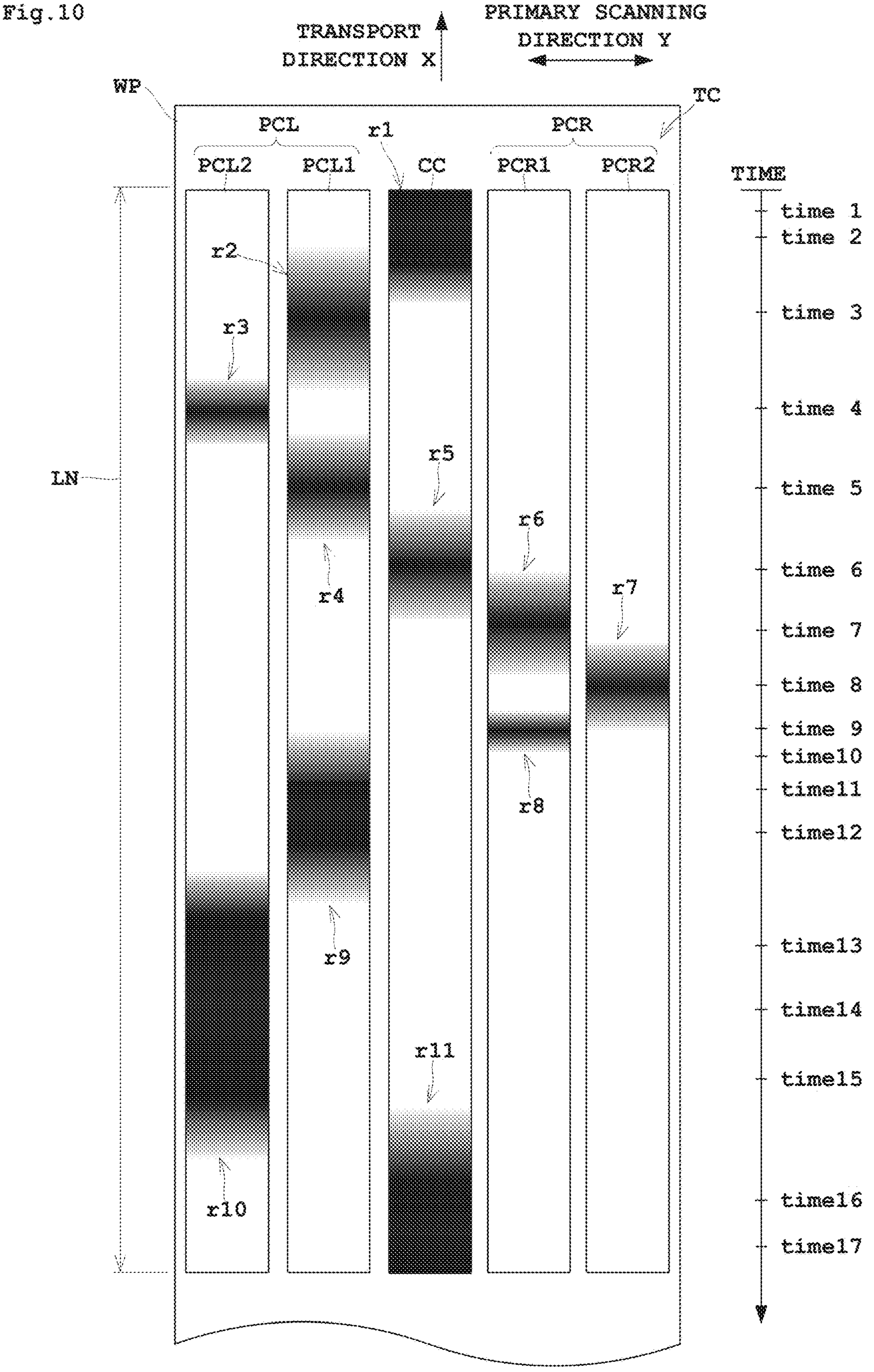
FIG. 10 is a schematic view of one example of shift amount detecting chart printed in a state where shift amounts are accompanied by temporal variations.

Consider now a case where only the transporting speed of the web paper WP is accompanied by temporal variations while the shift amounts of ink dispensation timing between the print head 19*a* and print head 19*b* continue the ideal conditions. In this case, the shift amount detecting chart TC becomes as shown in FIG. 10, for example. In this FIG. 10, since cyan (C) cannot be expressed, the areas where cyan (C) becomes dense are expressed in black, and the areas where cyan (C) becomes pale are expressed in white. The density peak positions where cyan (C) becomes the densest are expressed in the densest black.

With the web paper WP, the transporting speed may be changed by various causes. The transporting speed of the web paper WP deviating from the transporting speed in the ideal conditions may cause deteriorations in print quality (specifically, phenomena called level difference gap and color shift). It is necessary to alleviate the variations of the transporting speed by correcting the dispensation timing of the objective print head (print head 19*b*) relative to the reference print head (print head 19*a*). It is considered here that a correction value for the print head 19*b* is calculated by reading the shift amount detecting chart TC as shown in FIG. 10, and analyzing the read image.

As a further note, it is desirable to continue transporting the web paper WP under the transporting speed in the ideal conditions. For that purpose, it is necessary to determine and eliminate the cause of the variations of the transporting speed. However, it is not necessarily easy to determine the cause of the variations of the transporting speed of the web paper WP. Here, it is also possible to determine the cause of the variations of the transporting speed of the web paper WP by reading the shift amount detecting chart TC as shown in FIG. 10, and analyzing the read image.

As shown in FIG. 10, a plurality of high density areas r1-r11 have occurred in the shift amount detecting chart TC. For the purpose of description, a time axis TIME is added to the shift amount detecting chart TC to indicate approximate times at each the areas r1-r11 are printed. That is, area r1 is printed around times 1 and 2, area r2 around time 3, and area r3 around time 4.

Area r4 is printed around time 5, area r5 around time 6, area r6 around time 7, area r7 around time 8, area r8 around times 9 and 10, area r9 around times 11 and 12, area r10 around times 13 to 15, and area r11 around times 16 and 17.

The variations in the transporting speed of the web paper WP can be guessed as follows by analyzing the shift amount detecting chart TC. For example, in a time section from time 1 to time 2, the density of area r1 of the middle chart CC is higher than the density of the one-side peripheral charts PCL1 and PCL2 and the other side peripheral charts PCR1 and PCR2. It is therefore thought that, in this time section, the web paper WP is transported at the transporting speed in the ideal conditions.

On the other hand, in a time section from time 2 to time 3, while the density of the middle chart CC lowers, the density of the first one-side PCL1 rises. In this time section, the transporting speed of the web paper WP is considered to increase gradually from the ideal transporting speed. That is, when the transporting speed of the web paper WP gradually increases from the ideal transporting speed, the position of the first line segment group L1*g* relative to the second line segment group L2*g* shifts downstream in the transport direction X. As a result, the blank areas of the middle chart CC gradually increase (the density lowers), and the blank areas of the first one-side peripheral chart PCL1 gradually decrease (the density rises).

Around time 4, the density of the second one-side peripheral chart PCL2 is the highest (area r3). It is thought that, in this state, the first line segment group L1*g* is located in substantially the middle of the blank areas of the second one-side peripheral chart PCL2.

In a time section from time 4 to time 5, while the density of the second one-side peripheral chart PCL2 lowers, the density of the first one-side peripheral chart PCL1 rises. It is thought that, in this time section, the transporting speed of the web paper WP gradually decreases and returns toward the ideal transporting speed. That is, the reason is that, in this state, the position relative to the second line segment group L2*g* of the first line segment group L1*g* considered to be located in substantially the middle of the blank areas of the second one-side peripheral chart PCL2 shifts upstream in the transport direction X (the density lowers), and the first line segment group L1*g* of the first one-side peripheral chart PCL1 shifts toward the middle positions of the blank areas (the density rises).

Each of the transporting speed of the web paper WP, preceding times t1 and t2, delay times t3 and t4, distances d1 and d2 under the ideal conditions are all known. Thus, varying states of the transporting speed of the web paper WP can be guessed by analyzing the state of density variations of the shift amount detecting chart TC. This will be described in detail hereinafter.

This embodiment assumes that the density peak position where cyan (C) is the densest moves from the middle chart CC to the one-side peripheral chart PCL1, one-side peripheral chart PCL2, one-side peripheral chart PCL1, middle chart CC, other side peripheral chart PCR1, other side peripheral chart PCR2, other side peripheral chart PCR1, one-side peripheral chart PCL1, one-side peripheral chart PCL2, and middle peripheral chart CC. Correspondence relationships are determined such that the middle chart CC to shift amount=0, the one-side peripheral chart PCL1 to shift amount=−1, the one-side peripheral chart PCL2 to shift amount=−2, the other side peripheral chart PCR1 to shift amount=+1, and the other side peripheral chart PCR2 to shift amount=+2. Each of the shift amounts −1, −2, +1 and +2 is determined beforehand to correspond to a specific shift amount unit (e.g. 0.25 μm) for each inkjet printing apparatus 3.

The image processor 27 carries out image processing of image data corresponding to the shift amount detecting chart TC of FIG. 10. First, a variation trace of the density peak position where cyan (C) is the densest in the primary scanning direction Y within the predetermined length LN is determined. Although density peak positions in the transport direction X are in values as indicated by "x" marks in FIG. 11, it is preferable, for example, to carry out a smoothing process of graphs on a polygonal line connecting the density peak positions to create a curved variation trace. Further, the image processor 27 calculates a frequency distribution of shift amounts by dividing at predetermined intervals in the transport direction X, the curve showing the variation trace of the density peak positions as shown in FIG. 7.

Figure 11:
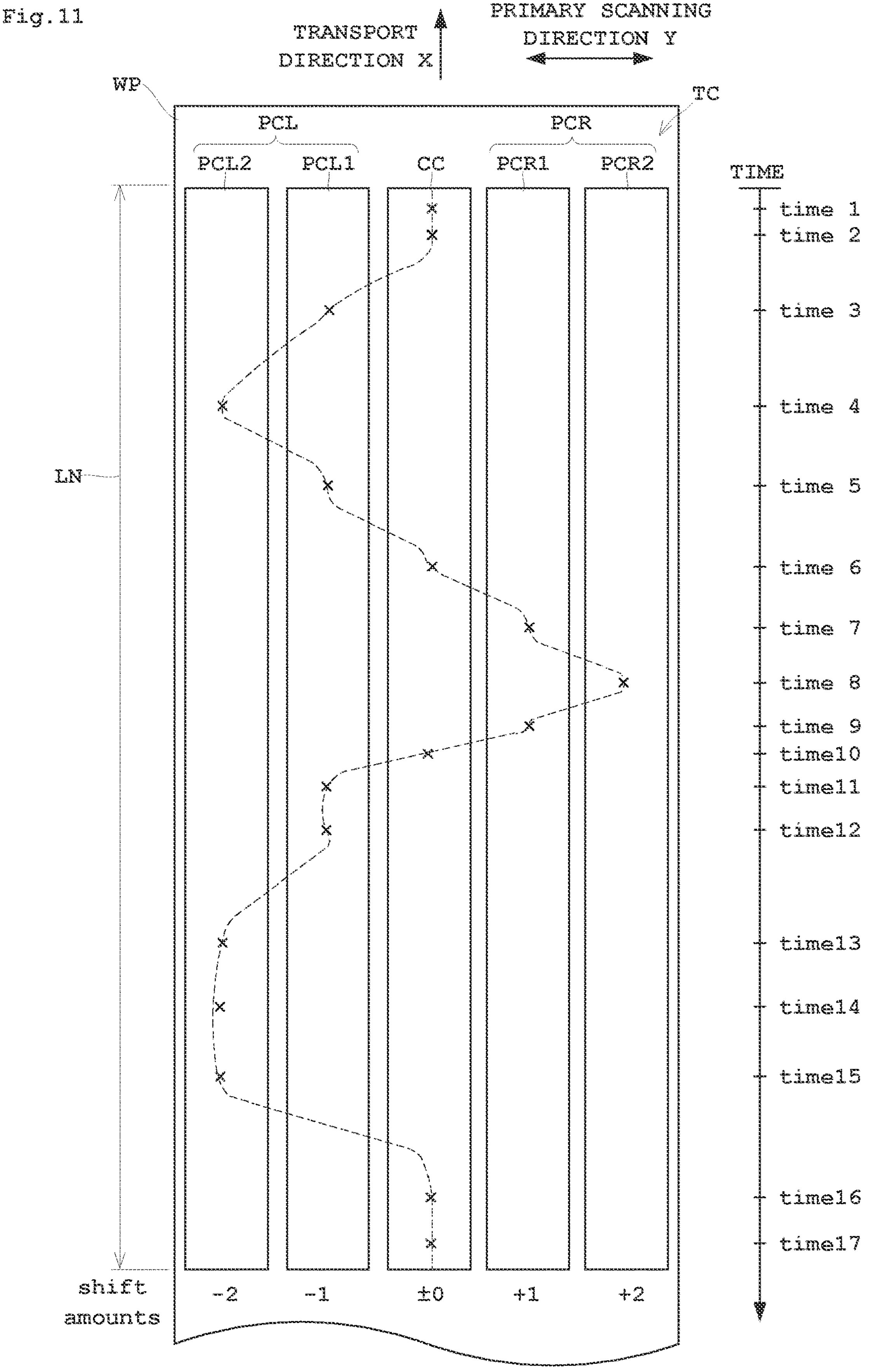
FIG. 11 is a graph showing variations of a density peak position in the shift amount detecting chart of FIG. 6.
Figure 12:
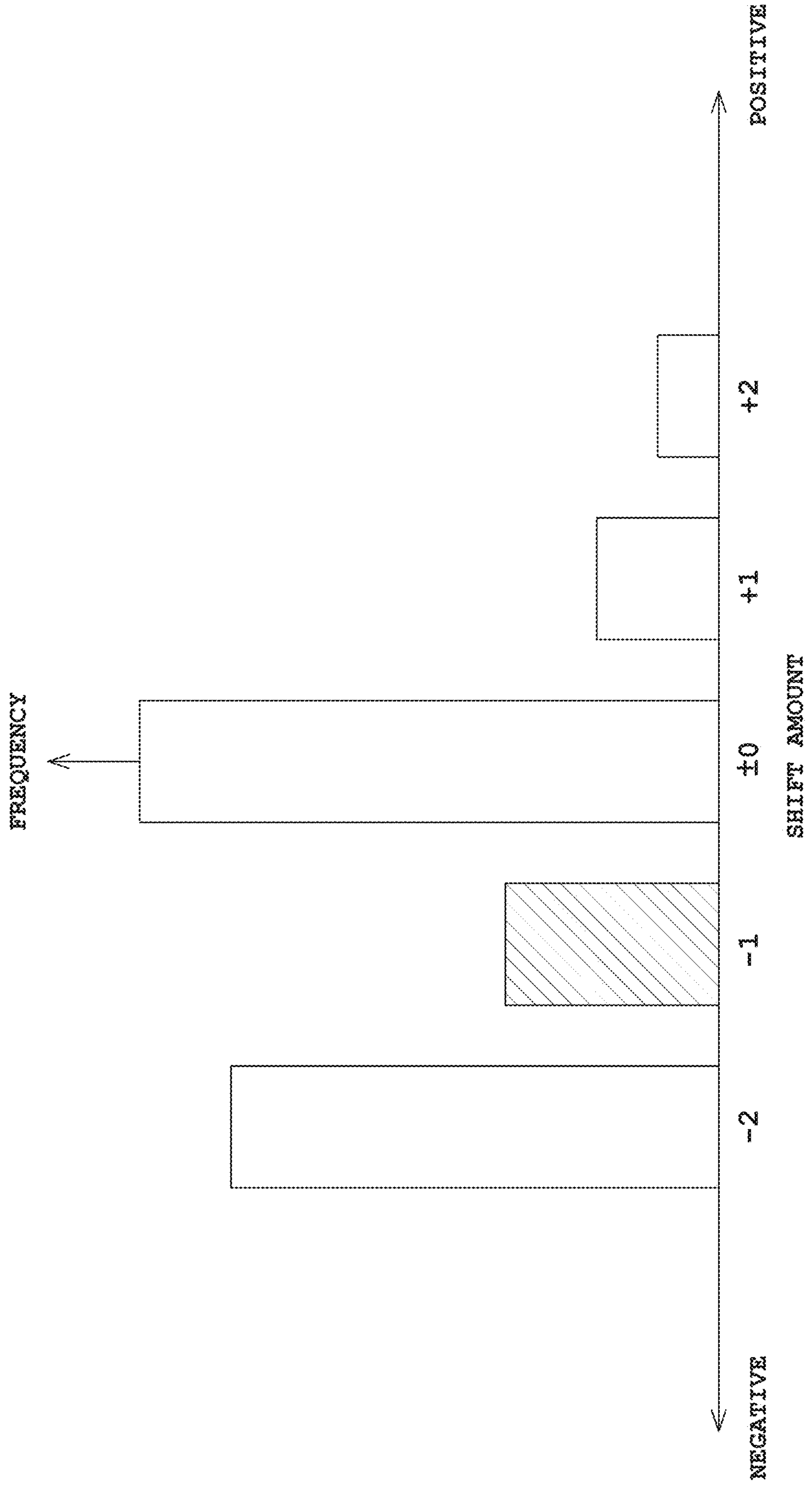
FIG. 12 is a frequency distribution view of the density peak position in the graph of FIG. 11.

Here, the image processor 27 creates a frequency distribution table based on FIG. 11. Assume, for example, that a frequency distribution table as shown in FIG. 12 is obtained. The frequency is the highest at the time of shift amount}0, and then frequencies line up in the order of shift amounts −2, −1, +1, and +2. The image processor 27 can calculate correction values based on the frequency distribution table.

As methods of calculating the correction values from the frequency distribution table, the following techniques are conceivable, for example.

Technique 1

This is a technique of calculating correction values based on shift amounts smaller than maximum shift amounts in absolute values in the shift amount detecting chart. In the example of FIG. 12, maximum shift amounts in absolute values are "−2" and "+2". When correction values are calculated based on the shift amount "−2" or "+2", there is a possibility of setting correction values based on outliers. Consequently, what is necessary is to install correction values based on one of shift amounts "−1", "±0", and "+1" rather than shift amounts "−2" and "+2". If shift amounts are calculated in this way, setting correction values based on outliers can be avoided. Among shift amounts "−1", "±0", and "+1", the frequency of shift amount "±0" is relatively high, and thus correction values may be calculated based on shift amount "±0."

Technique 2

This is a technique of calculating correction values based on a shift amount of highest frequency. In the example of FIG. 12, since the frequency of shift amount "±0" is the highest, correction values are calculated based on shift amount "±0". By calculating correction values in this way, the maximum value of shift amounts can be restrained.

Technique 3

This is a technique of determining correction values to minimize a sum total of corrected shift amounts. Description will be made by taking for example the above-mentioned areas r1-r5 in FIG. 10. The shift amounts of areas r1-r5 are as in Table 1. Note that the shift amounts in Table 1 are amounts corresponding to distances from the middle chart CC to the density peak positions which are expressed in integers in units of the number of charts.

TABLE 1

| AREA NAME | SHIFT AMOUNT |
|---|---|
| r1 | ±0 |
| r2 | −1 |
| r3 | −2 |
| r4 | −1 |
| r5 | ±0 |

Assume that the five correction values shown in Table 2 are applied to the above-mentioned areas r1-r5, respectively. Here, a negative correction value is a correction value for adjusting (advancing) the ink dispensation timing of the print head 19*b* to move the density peak positions rightward in the primary scanning direction in the shift amount detecting chart TC. The positive correction values are correction values for adjusting (delaying) the ink dispensation timing of the print head 19*b* to move the density peak positions leftward in the primary scanning direction in the shift amount detecting chart TC.

TABLE 2

| CORRECTION VALUE | CORRECTION VALUE | CORRECTION VALUE | CORRECTION VALUE | CORRECTION VALUE |
|---|---|---|---|---|
| −2 | −1 | ±0 | +1 | +2 |

The sum totals of the shift amounts of areas r1-r5 after corrections with the above-mentioned five correction values and the shift amounts after the corrections of areas r1-r5 are as in Table 3. Note that the shift amounts in Table 3 are amounts corresponding to the distances from the middle chart CC to the density peak positions which are expressed in absolute values in units of the number of charts.

TABLE 3

| | SHIFT VALUE AFTER CORRECTION | | | | |
|---|---|---|---|---|---|
| AREA NAME | CORRECTION VALUE −2 | CORRECTION VALUE −1 | CORRECTION VALUE ±0 | CORRECTION VALUE +1 | CORRECTION VALUE +2 |
| AREA r1 | 2 | 1 | 0 | 1 | 2 |
| AREA r2 | 3 | 2 | 1 | 0 | 1 |
| AREA r3 | 4 | 3 | 2 | 1 | 0 |
| AREA r4 | 3 | 2 | 1 | 0 | 1 |
| AREA r5 | 2 | 1 | 0 | 1 | 2 |
| SUM TOTAL OF SHIFT AMOUNTS | 14 | 9 | 4 | 3 | 6 |

As seen from Table 3, if the ink dispensing timing of the print head 19*b* is corrected based on correction value +1, the sum total of the shift amounts after the corrections of areas r1-r5 become the smallest (sum total of shift amounts=3). Consequently, correction value +1 is determined to be the correction value applied to areas r1-r5.

For simplicity, an example is taken here from the case of determining the sum totals of the shift amounts after corrections only for areas 1r to r5. However, the number of areas r applicable to analysis may be larger or smaller. For example, all the areas r included in the predetermined length LN of the web paper WP may be made applicable to analysis, and sum totals of the shift amounts after correction may be determined accordingly. Further, it is desirable to determine the areas r applicable to analysis, so that the intervals in the transport direction X between adjoining areas r will become uniform.

The image processor 27 stores the correction values calculated by any one of the above techniques in the correction value memory 37.

Figure 13:
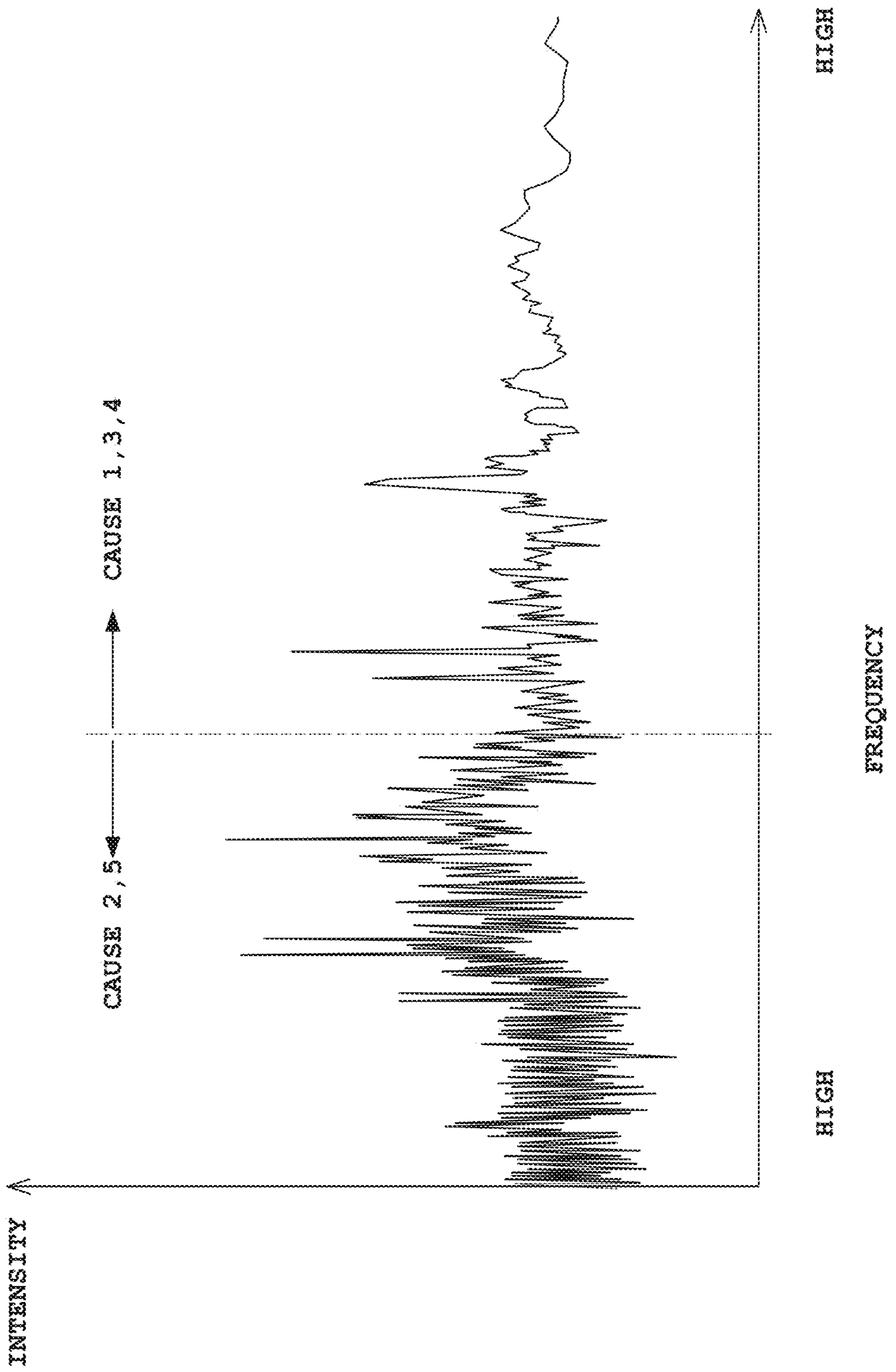
FIG. 13 is a graph showing frequency versus intensity in the graph of FIG. 11.

Reference is now made to FIG. 13. FIG. 13 is a graph showing frequency versus intensity in the graph of FIG. 11.

The temporal variation trace of the shift amounts obtained by the image processor 27 as shown in FIG. 11 noted above is given to the analysis unit 29. The analysis unit 29 analyzes the variation trace of the density peak positions, and extracts the frequency versus intensity thereof. The results form a graph as shown in FIG. 13, for example. The point which should be noted in this graph is that some peak positions exist in the frequency. The inkjet printing system includes drivers such as the drive rollers 9 and 11, and movable parts such as fans (not shown) provided for the drive boards 35 to suck mist of the ink droplets. These drivers and movable parts can be a cause of transport variations of the web paper WP, and a cause of image shifting. These causes and the peak positions of the frequency in the frequency versus intensity are known from experience to have a certain level of correlation. As the above causes, the following is mentioned, for example.

Cause 1: Peripheral Length (Rotating Cycle) of Drive Rollers 9 and 11

Countermeasures: Improvement in roller processing accuracy (10 μm or less in total deflection amount), and printing timing correction Cause 2: Number of rolling element passages of bearings in drive rollers 9 and 11

Countermeasures: Change to bearings without rolling elements, such as slide bearings or air bearings Cause 3: Peripheral length of original fabric (wind-off roll) in paper feeder 1

Countermeasures: Improvement in response of tension control (adoption of a tension control system for suppressing wind-off variations), adoption of a construction for attenuating variations of sheet feeder 1, and printing timing correction Cause 4: Peripheral length of transport roller 9

Countermeasures: Improvement in processing accuracy for transport roller 9 (10 μm or less in total deflection amount), and printing timing correction Cause 5: Mist suction fans of drive boards 35, and rotating cycles of the fans that suck up the web paper WP Countermeasures: Change of the fans, and interpose members not transmitting vibration Of the above causes 1-5, for example, causes 1, 3, and 4 are applicable to peak positions in low frequencies, and causes 2 and 5 are applicable to peak positions in high frequencies.

Consequently, the operator of the inkjet printing system can guess to some extent the causes of the temporal variations of the shift amounts by displaying the graph of frequency versus intensity on the display unit 31 as results of the analysis by the analysis unit 29. As a result, it is possible to efficiently carry out countermeasures such as suppressing the temporal variations of the shift amounts in the ink jet printing system, thereby further improving printing quality.

Figure 14:
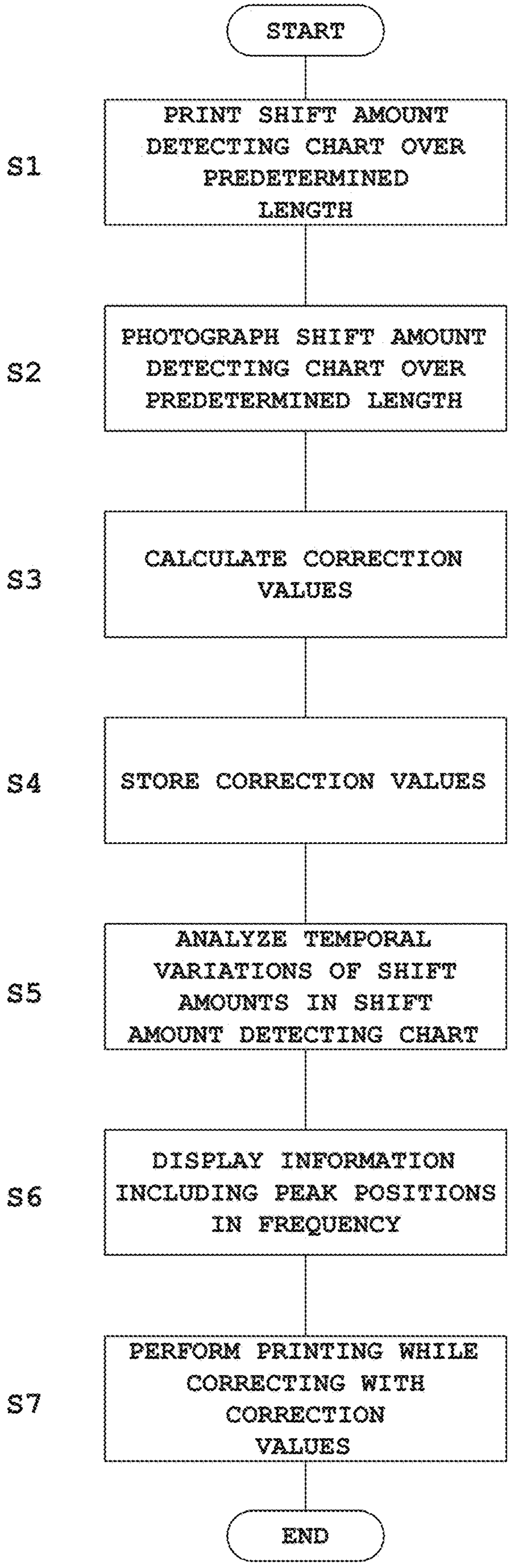
FIG. 14 is a flow chart showing an example of processing sequence in the embodiment.

Next, processing in the inkjet printing system having the above construction will be described with reference to FIG. 14. FIG. 14 is a flow chart showing an example of processing sequence in the embodiment.

Step S1 (Shift Amount Detecting Chart Forming Step)

The controller 25 operates the drive rollers 7 and 11, and drive boards 35 to print the shift amount detecting chart TC described above, with the print heads 19 over the predetermined length LN of the web paper WP.

Step S2 (Imaging Step)

The controller 25 operates the image pickup unit 17 to photograph the shift amount detecting chart TC printed on the web paper WP, and collect image data corresponding to the shift amount detecting chart TC. The image data corresponding to the shift amount detecting chart TC is given to the image processor 27.

Step S3 (Correction Value Calculating Step)

The image processor 27 determines a variation trace of density peak positions based on the image data corresponding to the shift amount detecting chart TC. The image processor 27 calculates correction values based on the techniques described above and based on the variation trace.

Step S4 (Correction Value Storing Step)

The image processor 27 stores the correction values calculated in the above step S3 in the correction value memory 37.

Step S5 (Extracting Step)

The analysis unit 29, based on the image data corresponding to the shift amount detecting chart TC, analyzes the variation trace of the density peak positions in the primary scanning direction Y within the predetermined length LN, and extracts frequency versus intensity.

Step S6 (Output Step)

The analysis unit 29 outputs to and displays on the display unit 31 the information including the peak positions of the frequency in the frequency versus intensity extracted in step S5. The operator of the inkjet printing system may look at the display on the display unit 31, and take countermeasures to a cause of temporal variations of the shift amounts.

Step S7 (Correcting Step)

After the above series of processes, the controller 25 corrects printing timing with the correction values in the correction value memory 37, and prints products on the web paper WP. When countermeasures are taken after seeing the display in step S6, step S7 is executed after performing the processes again from step S1 and storing new correction values in the correction value memory 37.

In the foregoing description, to facilitate understanding of the invention, only the correction amounts of the print head 19*a* (black (K)) and print head 19*b* (cyan (C)) are determined. However, it is preferable to calculate correction amounts of the print head 19*a* (black (K)) and print head 19*c* (magenta (M)), and correction amounts of the print head 19*a* (black (K)) and print head 19*d* (yellow (Y)) as necessary.

According to this embodiment, the shift amount detecting chart TC is formed on the web paper WP transported by the drive rollers 9 and 11 and transport rollers 9, and the shift amount detecting chart TC is photographed by the image pickup unit 17. The image processor 27, from the image data corresponding to the shift amount detecting chart TC photographed by the image pickup unit 17, and based on the variation trace of the density peak positions, calculates shift amounts smaller than the maximum shift amount in absolute values as correction values, and the controller 25 corrects printing timing with these correction values. Consequently, even when temporal variations occur to the shift amounts within the predetermined length LN, since the shift amounts smaller than the maximum shift amount in absolute values are made the correction values, an excessive correction can be prevented, thereby to improve printing quality.

Further, the image processor 27 selects median values as the correction values from a histogram obtained, and this is less vulnerable to the influence of noise than the case where average values are made the correction values. Consequently, even in the presence of outliers resulting from noise or the like, an excessive correction can prevented, to realize calculation of more appropriate correction values.

Generally, the size and cycle of temporal variations of the shift amounts vary from each individual to another of the inkjet printing apparatus 3. Then, one cycle of temporal variations of the shift amounts may be measured beforehand, and the shift amount detecting chart TC may be formed on the web paper WP covering the predetermined length LN which corresponds to the cycle. Thus, the correction values can be calculated appropriately.

This invention is not limited to the foregoing embodiment, but can be modified as follows:

(1) The foregoing embodiment has been described taking the inkjet printing apparatus 3 as an example of printing apparatus. However, this invention is applicable also to other types of printing apparatus as long as image shifting (misregister) occurs thereto and a plurality of print heads 19 are provided.

(2) In the foregoing embodiment, in the foregoing embodiment, the charts CC, PCL1, PCL2, PCR1, and PCR2 are formed as corresponding to the head modules HM (HMa-HMe), respectively. However, this invention is not limited to such a configuration.

Figure 15:
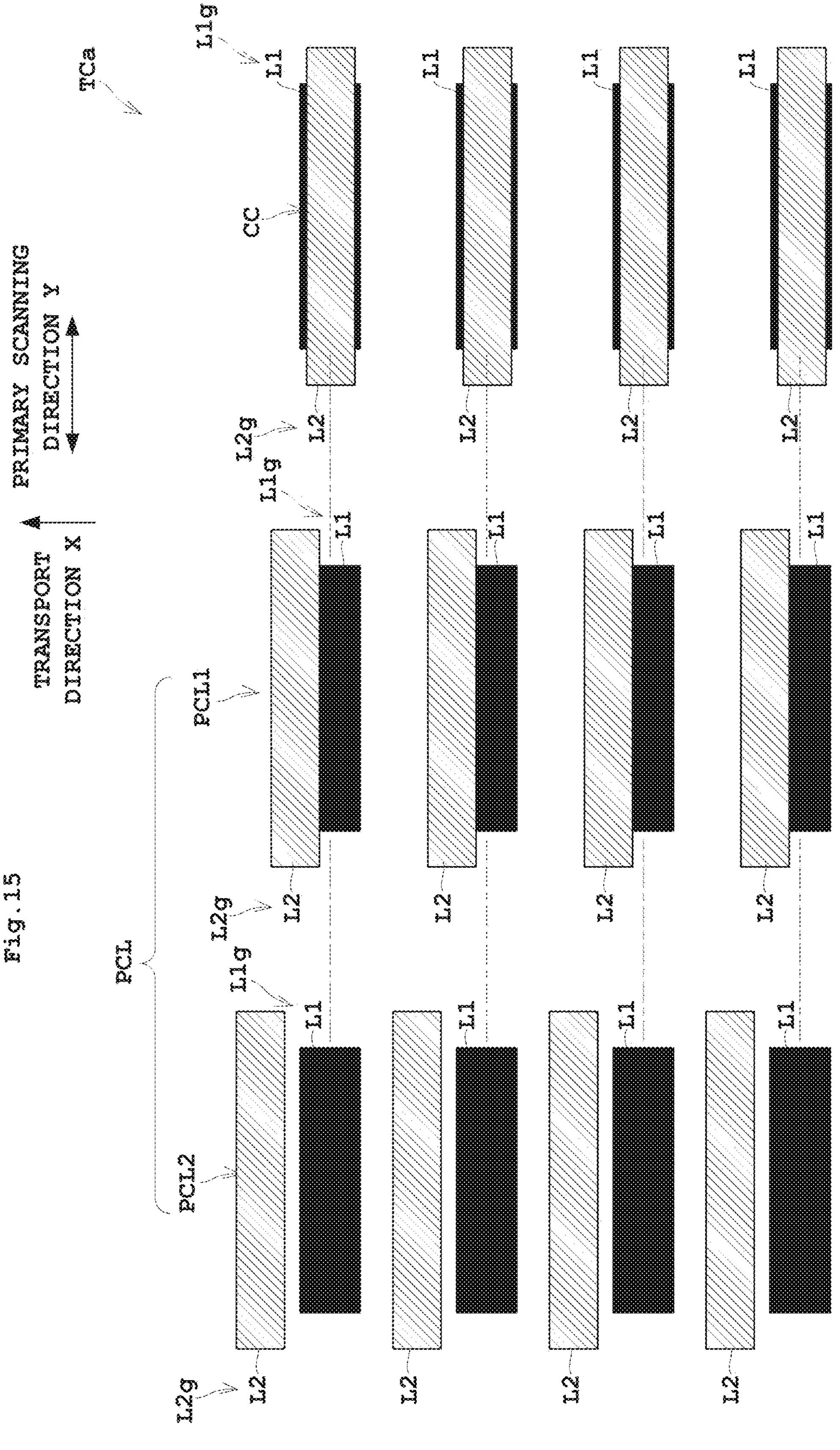
FIG. 15 is a schematic view showing a middle chart and part of one-side peripheral charts of a shift amount detecting chart according to a modified example.
Figure 16:
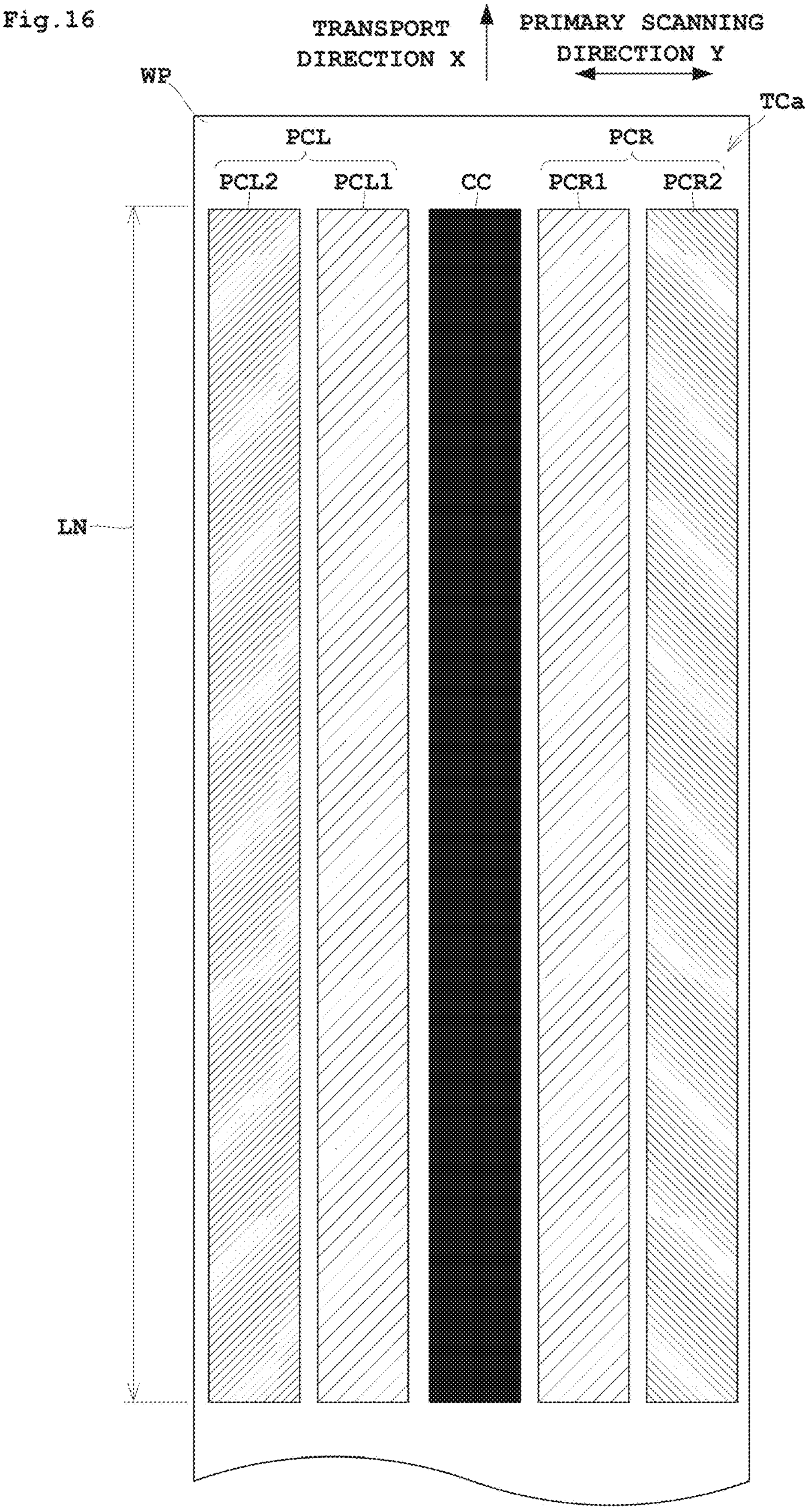
FIG. 16 is a schematic view showing the shift amount detecting chart printed when no temporal variations occur in a transporting speed of web paper in FIG. 15.

(3) The foregoing embodiment has been described taking what is shown in FIGS. 3-8 as an example of shift amount detecting chart TC. This invention is not limited to such a configuration. A modified example of the shift amount detecting chart will now be described with reference to FIGS. 15 and 16. FIG. 15 is a schematic view showing a middle chart and part of one-side peripheral charts of a shift amount detecting chart according to a modified example. FIG. 16 is a schematic view showing the shift amount detecting chart printed when no temporal variations occur in a transporting speed of web paper WP in FIG. 15.

The shift amount detecting chart TC described above has the second line segments L2 in the middle chart CC formed and arranged in the middle between the first line segments L1 in the transport direction X. Instead of this, as shown in FIG. 15, a shift amount detecting chart TCa may include a middle chart CC having second line segments L2 (line segments in cyan (C)) in the middle of first line segments L1 (line segments in black (K)) in the transport direction X. The one-side peripheral charts PCL (PCL1, PCL2) may have first line segments L1 and second line segments L2 formed at intervals gradually widening, progressively toward the end in the primary scanning direction Y. The other side peripheral charts PCR, though omitted from the drawing, may have first line segments L1 and second line segments L2 formed at intervals gradually narrowing, progressively toward the end in the primary scanning direction Y. With the shift amount detecting chart TCa having the second line segments L2 (line segments in cyan (C)) formed in the middle of the first line segments L1 (line segments in black (K)), the case where no shifting occurs is as shown in FIG. 16. That is, the middle chart CC has the highest density of black (K), and the one-side peripheral chart PCL2 and the other side peripheral chart PCR2 at the ends in the primary scanning direction Y have the highest density of cyan (C). And when temporal variations occur to the transporting speed of the web paper WP, the shift amount detecting chart TCa will come to have reversed the density variations in FIG. 10, for example. Note that, in the above shift amount detecting charts TC and TCa, the narrowing and widening of the intervals in the one-side peripheral charts PCL and other side peripheral charts PCR may be in a reversed relationship.

(4) In the foregoing embodiment, the second line segments L2 of the shift amount detecting charts TC and TCa are formed to have the long sides longer than those of the first line segments L1. This length relationship may be reversed.

(5) When there is little influence of outliers such as noise, the correction values may be calculated from average values of the shift amounts. This makes the process of creating histograms unnecessary, thereby to lighten the arithmetic load.

(6) In the foregoing embodiment, the inkjet printing apparatus 3 includes the analysis unit 29 and display unit 31. This invention does not require these as indispensable.

(7) The foregoing embodiment has been described taking for example the printing apparatus capable of color printing. However, this invention is also applicable to printing apparatus for monochromatic printing.

(8) The foregoing embodiment has been described taking the web paper WP as an example of printing media. This invention is not limited to such a printing medium. This invention is also applicable to cut paper (flat paper), and to film other than paper.

INDUSTRIAL UTILITY

As described above, this invention is suitable for a printing apparatus and a printing method for performing printing with a plurality of print heads arranged at intervals in a transport direction of a printing medium.

REFERENCE SIGNS LIST

1 . . . paper feeder
3 . . . inkjet printing apparatus
5 takeup roller
WP . . . web paper
7, 11 . . . drive rollers
9 . . . transport rollers
13 . . . printing unit
15 . . . dryer
17 . . . image pickup unit
19 (19*a*-19*d*) . . . print heads
HM (HMa-HMe) . . . head modules
25 . . . controller
27 . . . image processor
29 . . . analysis unit
31 . . . display unit
33 . . . data processor
35 . . . drive boards
37 . . . correction value memory
TC, TCa . . . shift amount detecting charts
CC . . . middle chart PCL (PCL1, PCL2) . . . one-side peripheral charts
PCR (PCR1, PCR2) . . . other side peripheral charts
L1 . . . first line segments
L1*g* . . . first line segment groups
L2 . . . second line segments
L2*g* . . . second line segment groups

What is claimed is:

1. A printing apparatus for printing on a printing medium, comprising:

a transport device for transporting the printing medium in a transport direction;

a plurality of print heads arranged separately in the transport direction for printing on the printing medium;

a shift amount detecting chart forming device for forming a shift amount detecting chart on the printing medium, the shift amount detecting chart including:

a middle chart printed in a middle portion of the printing medium in a primary scanning direction perpendicular to the transport direction, and having:

a first line segment group of first line segments formed as arranged at constant intervals over a predetermined length in the transport direction, and having a long side in the primary scanning direction, by a reference print head serving as reference position in the transporting direction among the plurality of print heads, and a second line segment group of second line segments formed by an objective print head disposed separately in the transport direction from the reference print head among the plurality of print heads, to have a long side in the primary scanning direction, and located in a middle in the transport direction between the first line segments, or at centers in the transport direction of the first line segments;

one-side peripheral charts formed separately on one side in the primary scanning direction from the middle chart, with the intervals in the transport direction of the first line segments and the second line segments in the middle chart gradually widening, progressively toward an end in the primary scanning direction; and other side peripheral charts formed separately on the other side in the primary scanning direction from the middle chart direction, with the intervals in the transport direction of the first line segments and the second line segments in the middle chart gradually narrowing, progressively toward the end in the primary scanning direction;

an image pickup device for photographing the shift amount detecting chart printed on the printing medium;

a calculating device, with reference to the shift amount detecting chart photographed by the image pickup device, and based on a variation trace of density peak positions in the primary scanning direction within the predetermined length, for calculating correction values from shift amounts smaller than a maximum shift amount in absolute values in the shift amount detecting chart; and a correcting device for correcting printing timing of the objective print head relative to the reference print head with the correction values.

2. The printing apparatus according to claim 1, wherein the calculating device is configured to determine the correction values based on a frequency of occurrence of the shift amounts.

3. The printing apparatus according to claim 1, wherein the calculating device is configured to determine the correction values in a way to minimize a sum total of the shift amounts after correction.

4. The printing apparatus according to claim 1, further comprising:

an extracting device for extracting frequency versus intensity of the density peak positions in the predetermined length about the shift amount detecting chart; and an output device for outputting information including peak positions of the frequency.

5. The printing apparatus according to claim 1, wherein the predetermined length corresponds to one cycle of temporal variations of shift amounts measured beforehand.

6. A printing method for printing on a printing medium, comprising:

a shift amount detecting chart forming step for forming a shift amount detecting chart on the printing medium, the shift amount detecting chart including:

a middle chart printed in a middle portion of the printing medium in a primary scanning direction perpendicular to a transport direction, and having:

a first line segment group of first line segments formed as arranged at constant intervals over a predetermined length in the transport direction, and having a long side in the primary scanning direction, by a reference print head serving as reference position in the transporting direction among a plurality of print heads arranged separately in the transport direction for printing on the printing medium, and a second line segment group of second line segments formed by an objective print head disposed separately in the transport direction from the reference print head among the plurality of print heads, to have a long side in the primary scanning direction, and located in a middle in the transport direction between the first line segments, or at centers in the transport direction of the first line segments;

one-side peripheral charts formed separately on one side in the primary scanning direction from the middle chart, with the intervals in the transport direction of the first line segments and the second line segments in the middle chart gradually widening, progressively toward an end in the primary scanning direction; and other side peripheral charts formed separately on the other side in the primary scanning direction from the middle chart direction, with the intervals in the transport direction of the first line segments and the second line segments in the middle chart gradually narrowing, progressively toward the end in the primary scanning direction;

an image pickup step for photographing the shift amount detecting chart printed on the printing medium;

a correction value calculating step, with reference to the shift amount detecting chart photographed by an image pickup device, and based on a variation trace of density peak positions in the primary scanning direction within the predetermined length, for calculating correction values from shift amounts smaller than a maximum shift amount in absolute values in the shift amount detecting chart; and a correcting step for correcting printing timing of the objective print head relative to the reference print head with the correction values.

7. The printing method according to claim 6, wherein the correction value calculating step is executed to determine the correction values based on a frequency of occurrence of the shift amounts.

8. The printing method according to claim 6, wherein the correction value calculating step is executed to determine the correction values in a way to minimize a sum total of the shift amounts after correction.

9. The printing method according to claim 6, further comprising:

an extracting step for extracting frequency versus intensity of the density peak positions in the predetermined length about the shift amount detecting chart; and an output step for outputting information including peak positions of the frequency.

10. The printing method according to claim 6, wherein the predetermined length corresponds to one cycle of temporal variations of shift amounts measured beforehand.

* * * * *